US012679853B2

(12) United States Patent
Hwang et al.

(10) Patent No.: US 12,679,853 B2
(45) Date of Patent: Jul. 14, 2026

(54) MAGNESIUM-SERINATE COMPOUND AND USE THEREOF

(71) Applicant: Astrogen Co., Ltd., Daegu (KR)

(72) Inventors: Su-Kyeong Hwang, Daegu (KR); Min Yong Lee, Gyeongsangbuk-do (KR); Min Sook Seo, Daegu (KR); Do Youn Jun, Gyeongsangbuk-do (KR); Min Joo Kim, Daegu (KR); Young Ho Kim, Gyeongsangbuk-do (KR); Young Kyoung Jo, Daegu (KR)

(73) Assignee: Astrogen Co., Ltd., Daegu (KR)

( * ) Notice: Subject to any disclaimer, the term of this patent is extended or adjusted under 35 U.S.C. 154(b) by 706 days.

(21) Appl. No.: 17/270,123

(22) PCT Filed: Feb. 12, 2019

(86) PCT No.: PCT/KR2019/001647
§ 371 (c)(1),
(2) Date: Feb. 22, 2021

(87) PCT Pub. No.: WO2020/040382
PCT Pub. Date: Feb. 27, 2020

(65) Prior Publication Data
US 2021/0340161 A1 Nov. 4, 2021

(30) Foreign Application Priority Data
Aug. 23, 2018 (KR) ........................ 10-2018-0098661

(51) Int. Cl.
| | |
|---|---|
| *C07F 3/02* | (2006.01) |
| *A23K 20/24* | (2016.01) |
| *A23L 33/165* | (2016.01) |

(52) U.S. Cl.
CPC ................ *C07F 3/02* (2013.01); *A23K 20/24* (2016.05); *A23L 33/165* (2016.08)

(58) Field of Classification Search
CPC ..... A61K 31/28; A23V 2200/322; C07F 3/02; C07C 229/76; A61P 25/28; A23L 33/10; A23L 33/16; A23L 33/165; A23K 20/10; A23K 20/24
See application file for complete search history.

(56) References Cited

U.S. PATENT DOCUMENTS

| | | | |
|---|---|---|---|
| 4,725,427 | A | 2/1988 | Ashmead et al. |
| 5,504,055 | A | 4/1996 | Hsu |
| 6,426,424 | B1 | 7/2002 | Ashmead et al. |
| 9,346,830 | B2 | 5/2016 | Ramhold et al. |
| 2005/0239750 | A1 | 10/2005 | Motyka et al. |
| 2011/0237670 | A1 | 9/2011 | Klamer |
| 2014/0212893 | A1 | 7/2014 | Cox et al. |

FOREIGN PATENT DOCUMENTS

| | | | |
|---|---|---|---|
| CN | 1374025 | A | 10/2002 |
| CN | 101302171 | A | 11/2008 |
| JP | H10245369 | A | 9/1998 |
| KR | 10-2001-0022323 | A | 3/2001 |
| WO | 9952519 | A2 | 10/1999 |
| WO | 2004000297 | A1 | 12/2003 |
| WO | 2013078395 | A1 | 5/2013 |

OTHER PUBLICATIONS

Chinese Office Action in Chinese Patent Application No. 201980053116.2, dated Feb. 26, 2023, 4 pgs.
Sikora, M. et al., "Biogenic Amino Acids and their Metal Salts as Catalysts of Cararmelization," Starch/Stark (1994) 46 (4):150-155.
Aoyama K, Watabe M, Nakaki T. Regulation of neuronal glutathione synthesis. J Pharmacol sci. 2008;108(3):227-38.
Coskun, P. et al. A Mitochondrial Etiology of Alzheimer and Parkinson Disease. Biochim Biophys Acta. May 2012; 1820(5):553-564.
Cozzolino M, Care MT. Mitochondrial dysfunction in ALS. Prog Neurobiol. 2012;97(2):54-66.
De Miranda J, Santoro A, Engelender S, Wolosker H. Human serine racemase: moleular cloning, genomic organization and functional analysis. Gene. 2000;256(1-2):183-8.
Dunlop RA, Powell JT, Metcalf JS, Guillemin GJ, Cox PA. L-Serine-mediated neuroprotection includes the upregulation of the ER stress chaperone protein disulfide isomerase (PDI). Neurotox Res. 2018;33(1):113-122.
El-Hattab AW. Serine biosynthesis and transport defects. Mol Genet Metab. 2016;118(3):153-159.
International Search Report in International Patent Application No. PCT/KR2020/000154, dated Apr. 14, 2020, 4 pgs.
Jahnen-Dechent W, Ketteler M. Magnesium basics Clin Kidney J 2012;5:13-14.
Farshbaf, MJ et al. Huntington's Disease and Mitochondria. Neurotox Res. 2017;32:518-529.
Kubota, S. et al. Conformation of Sequential Polypeptides of (Lysi-Leuj), (Lysi-Serj), and (Lys-Gly) in Sodium Dodecyl Sulfate Solution, Biopolymers (1983) 22:2237-2252.
Lucas S et al. Serine catabolismis essential to maintain mitochondrial respiration in mammalian cells. Life Science Alliance. 2018;1(2):e201800036, 10 pgs.
Ogawa S, Kitao Y, Hori O. Ischemia-induced neuronal cell death and stress response. Antioxid Redox Signal. 2007;9 (5):573-587.
Romani AMP. Magnesium homeostasis in mammalian cells. Met Ions Life Sci 2013;12:69-118.
Saris NEL, Mervaala E, Karppanen H, Khavaja JA, Lewenstam A. An update on physiological, clinical and analytical aspects. Clin Chim Acta 2000;294:1-26.

(Continued)

*Primary Examiner* — Jeffrey T. Palenik
(74) *Attorney, Agent, or Firm* — Wood Herron & Evans LLP

(57) ABSTRACT

The present invention relates to a novel magnesium-serinate compound and the use thereof, and more particularly, to a novel magnesium-serinate compound in which a magnesium atom is chelated to L-serine, and the pharmaceutical use thereof against central nervous system diseases or the like.

7 Claims, 14 Drawing Sheets

(56) References Cited

OTHER PUBLICATIONS

Smith QR et al. Kinetics of Neutral Amino Acid Transport Across the Blood-Brain Barrier. Journal of Neurochemistry. 1987;49:1651-1658.

Wolosker H, Panizzutti R, De Miranda J. Neurobiology through the looking-glass: D-serine as a new glial-derived transmitter. Neurochem Int. 2002;41(5):327-332.

Zhou X, He L, Wu C, Zhang Y, Wu X, Yin Y. Serine alleviates oxidative stress via supporting glutathione synthesis and methionine cycle in mice. Mol Nutr Food Res. 2017;61(11).

Search Report in International Application No. PCT/KR2019/001647, dated May 21, 2019, 4 pgs.

Bhat AH, Dar KB, Anees S, Zargar MA, Masood A, Sofi MA, Ganie SA. Oxidative stress, mitochondrial dysfunction and neurodegenerative diseases; a mechanistic insight. Biomed Pharmacother. 2015;74:101-110.

Boado RJ, Li JY, Nagaya M, Zhang C, Pardridge WM. Selective expression of the large neutral amino acid transporter at the blood-brain barrier. Proc Natl Acad Sci USA 1999;96(21):12079-12084.

Pompella A, Visvikis A, Paolicchi A, De Tata V, Casini AF. The changing faces of glutathione, a cellular protagonist. Biochem Pharmacol. 2003;66(8):1499-1503.

De Koning TJ, Duran M, Van Maktergem L, Pineda M, Dorland L, Gooskens R, Jaeken J, Poll-The BT. Congenital microcephaly and seizures due to 3-phosphoglycerate dehydrogenase deficiency: outcome of treatment with amino acids. J Inherit Metab Dis. 2002;25(2):119-125.

De Koning TJ, Snell K, Duran M, Berger R, Poll-The BT, Surtees R. L-serine in disease and development. Biochem J. 2003;371(Pt 3):653-661.

Doyle KM, Kennedy D, Gorman AM, Gupta S, Healy SJ, Samali A. Unfolded proteins and endoplasmic reticulum stress in neurodegenerative disorders. J Cell Mol Med. 2011;15(10):2025-2039.

Dranka BP, Hill BG, Darley-Usmar VM. Mitochondrial reserve capacity in endothelial cells: The impact of nitric oxide and reactive oxygen species. Free Radic Biol Med. 2010;48(7):905-914.

Farruggia G, Castiglioni S, Sargenti A, Marraccini C, Cazzaniga A, Merolle L, Iotti S, Cappadone C, Maier JA. Effects of supplementation with different Mg salts in cells: is there a clue? Magnes Res. 2014;27(1):25-34.

Franco-Iborra S, Vila M, Perier C. Mitochondrial quality control in neurodegenerative diseases: Focus on Parkinson's disease and Huntington's disease. Front Neurosci. 2018;12:342.

Furuya S, Tabata T, Mitoma J, Yamada K, Yamasaki M, Makino A, Yamamoto T, Watanabe M, Kano M, Hirabayashi Y. L-serine and glycine serve as major astroglia-derived trophic factors for cerebellar Purkinje neurons. Proc Natl Acad Sci USA. 2000;97(21):11528-11533.

Lench AM, Massey PV, Pollegioni L, Woodhall GL, Jones RS. Astroglial d-serine is the endogenous co-agonist at the presynaptic NMDA receptor in rat entorhinal cortex. Neuropharmacology. 2014;83:118-127.

Liu G, Weinger JG, Lu ZL, et al. Efficacy and safety of MMES-01, a synapse density enhancer, for treating cognitive Impairment in older adults: a randomized, double-blind, placebo-controlled trial. J Alzheimers Dis. 2015;49(4):971-90.

Metcalf JS, Dunlop RA, Powell JT, Banack SA, Cox PA. L-Serine: a Naturally occurring amino acid with therapeutic potential. Neurotox Res. 2018;33(1):213-221.

Mickley GA, Hoxha N, Luchsinger JL, et al. Chronic dietary magnesium-L-threonate speeds extinction and reduces spontaneous recovery of a conditioned taste aversion. Pharmacol Biochem Behav. 2013;106:16-26.

Ni WM, Williams JA, Ding WX. Mitochondrial dynamics and mitochondrial quality control. Redox Biol. 2015;4:6-13.

Pineda M, Vilaseca MA, Artuch R, Santos S, Garcia Gonzalez MM, Aracil A, Van Schaftingen E, Jaeken J. 3-phosphoglycerate dehydrogenase deficiency in a patient with West syndrome. Dev Med Child Neurol. 2000;42 (9):629-633.

Shahbah D, Hassan T, Morsy S, Saadany HE, Fathy M, Al-Ghobashy A, Elsamad N, Emam A, Elhewala A, Ibrahim B, Gebaly SE, Sayed HE, Ahmed H. Oral magnesium supplementation improves glycemic control and lipid profile in children with type 1 diabetes and hypomagnesaemia. Medicine (Baltimore). 2017;96(11):e6352.

Slutsky I, Abumaria N, Wu LJ, et al. Enhancement of learning and memory by elevating brain magnesium. Neuron. 2010;65(2):165-77.

Smith QR. Transport of glutamate and other amino acids at the blood-brain barrier. J Nutr. 2000;130(4S Suppl):1016S-1022S.

Swaminathan R. Magnesium metabolism and its disorders. Clin Biochem Rev 2003;24:47-66.

Tabatabaie L, Klomp LW, Rubio-Gozalbo ME, Spaapen LJ, Haagen AA, Dorland L, De Koning TJ. Expanding the clinical spectrum of 3-phosphoglycerate dehydrogenase deficiency. J Inherit Metab Dis. 2011;34(1):181-184.

Yamanaka R, Tabata S, Shindo Y, Hotta K, Suzuki K, Soga T, Oka K. Mitochondrial Mg2+ homeostasis decides cellular energy metabolism and vulnerability to stress. Sci Rep. 2016;6:30027.

Valenti D, de Bari L, De Filippis B, Henrion-Caude A, Vacca RA. Mitochondrial dysfunction as a central actor in Intellectual disability-related diseases: an overview of Down syndrome, autism, Fragile X and Rett syndrome. Neurosci Biobehav Rev. 2014;46 Pt 2:202-217.

Vink R. Magnesium in the CNS: recent advances and developments. Magnes Res. 2016;29(3):95-101.

Wang X, Wang W, Li L, Perry G, Lee HG, Zhu X. Oxidative stress and mitochondrial dysfunction in Alzheimer's disease. Biochim Biophys Acta. 2014;1842(8):1240-1247.

Youle RJ, van der Bliek AM. Mitochondrial fission, fusion, and stress. Science. 2012;337(6098):1062-1065.

Blaquiere, Colette et al., Inorganica Chimica Acta, 135(3); 179-189 (1987).

Kirkland, Anna E. et al., Nutrients, 10(6); 1-23 (2018).

Office Action in Eurasian Patent Application No. 202190447, mailed Jan. 22, 2024, 5 pgs.

Schwalfenberg, Gerry K. et al., Scientifica, 2017; 1-14 (2017).

Vink, Robert et al., Adelaide (AU): University of Adelaide Press, (2011).

Weiss, Decker et al., Journal of the American College of Nutrition, 37(4); 316-327 (2018).

Eurasian Office Action in Eurasion Patent Application No. 202190447, dated Aug. 12, 2024, 3 pgs. (no English language translation available).

Petrov, M.L., Krivchun, M.N., "Stereochemistry of Organic Compounds", Study Guide, St. Petersburg: SPbGTI (TU), 2005, p. 22.

CAS Registry No. 88992-12-5 (Entered STN Registry on Nov. 16, 1984) (Year: 1984).

Office Action in U.S. Appl. No. 17/287,680, dated Aug. 16, 2024, 15 pgs.

Launer, Philip J. et al., "Infrared Analysis of Organosilicon Compounds: Spectra-Structure Correlations," Silicon Compounds: Silanes & Silicones, 2013 Gelest, Inc. Morrisville, PA, pp. 175-178.

Gaillard, T. et al., "Far infrared spectra of solid state L-serine, L-threonine, L-cysteine, and L-methionine in different protonation states," Spectrochimica Acta Part A: Molecular and Biomolecular Spectroscopy 150 (2015) 301-307.

Al-Jeboori et al., Synthesis and characterization of some essential amino acid metal complexes having biological activity, Journal of Chemical and Pharmaceutical Research, 2013 5(10):172-176.

Han et al., Vibrational and Electronic Spectroscopic Characterizations of Amino Acid-Metal Complexes, Journal of the Korean Society for Applied Biological Chemistry, 53(6) 821-825 (2010).

Chesalov et al., Temperature Effects on the IR Spectra of Crystalline Amino Acids, Dipeptides, and Polyamino Acids. II. L- and DL-Serines, Journal of Structural Chemistry, vol. 49, No. 4, pp. 627-638, 2008.

(A)

(B)

MAGNESIUM-SERINATE COMPOUND AND USE THEREOF

TECHNICAL FIELD

The present invention relates to a novel magnesium-serinate compound and the use thereof, and more particularly, to a novel magnesium-serinate compound in which a magnesium atom is chelated to L-serine, and the pharmaceutical use thereof against central nervous system diseases or the like.

BACKGROUND ART

Magnesium is the fourth most abundant mineral in the human body. About 50% of the body's magnesium is stored in bones, while the remaining 50% exists mainly in the cells of body tissues and organs [Jahnen-Dechent and Ketteler, 2012; Farruggia et al., 2014]. Since magnesium acts as a cofactor for hundreds of enzymes in cells, magnesium is involved in major cellular reactions. In particular, magnesium is required for the stabilization of a number of enzymes involved in ATP-producing reactions and is involved in energy metabolism [Swaminathan, 2003; Saris et al., 2000; Romani, 2013]. In particular, it has recently been reported that magnesium homeostasis in the mitochondria, which are a major reservoir for magnesium in the cell, is regulated by the action of the mitochondrial inner membrane $Mg^{2+}$ transporter MRS2, and when the maintenance of magnesium homeostasis fails due to the defect of MRS2, ATP production is disrupted with changes in mitochondrial energy metabolism and morphology of mitochondria, and the cellular resistance to stress is decreased [Yamanaka et al., 2016]. These study results suggest that the regulation of magnesium homeostasis in the mitochondria plays an important role in the determination of intracellular energy metabolism and cellular resistance to stress.

In addition, the potential neuroprotective role of magnesium in ameliorating and alleviating diseases of the nervous system has been recognized over the past 30 years, but accurate analysis related to the therapeutic effect of magnesium in the clinical field is still insufficient. Recent study results have continuously suggested that magnesium plays an important role in relation to various neurological conditions, including headache, stress, alcohol/drug addiction, acute brain injury, seizures, Parkinson's disease and Alzheimer's disease [Vink, 2016].

In addition, several recent studies have reported that the oral supply of magnesium improves learning, memory and cognitive functions by increasing human brain plasticity [Slutsky et al., 2010]. Regarding recovery from brain aging, it was found that, for persons who ingested magnesium, brain aging was reversed by 9 to 14 years and brain function was restored [Liu et al., 2016].

However, the problem that the brain uptake and intracellular permeability of magnesium in the human body are low still remains a research subject to be improved. Researchers at the Massachusetts Institute of Technology (MIT) tested the compound magnesium-L-threonate, and found that magnesium-L-threonate has higher bioavailability and brain magnesium-enhancing function than inorganic magnesium salts, and thus can increase brain magnesium levels by about 15% [Mickley et al., 2013]. This study result suggests that magnesium organically bound to threonic acid, which is a type of sugar acid, has higher intracellular permeability and absorption rate into the central nervous system than magnesium which is in the form of an inorganic metal salt.

Meanwhile, L-serine, a type of amino acid, is not only a member of the protein family in vivo, but also plays an important role in biosynthesis of amino acids such as glycine and cysteine, biosynthesis of purine and pyrimidine, which are DNA precursors, biosynthesis of phosphatidylserine which is a cell membrane phospholipid, and biosynthesis of sphingomyelin, cerebrosides and D-serine in the brain. Therefore, the concentration of L-serine in cells directly contributes to the division, proliferation and growth of cells, and glycine and cysteine derived from L-serine are members of the S-transferase (GST) family known as major intracellular antioxidants [Pompella et al., 2003]. Thus, L-serine can also play an important role in a defense mechanism that protects cells from damage caused by reactive oxygen species (ROS) by acting as a source of precursors required for the production of intracellular GSH [Aoyama et al., 2008; Zhou et al., 2017].

L-serine required by human cells as described above can be biosynthesized through a phosphorylation pathway occurring in the cytoplasm. However, since the amount of L-serine biosynthesized in cells under disease or stress conditions is not sufficient compared to the amount of L-serine required by the cell, and thus L-serine is classified as a conditionally essential amino acid that needs to be supplied externally to the body through food. In particular, it is known that, because the blood-brain barrier (BBB) permeability of L-serine is relatively low, congenital genetic defects of the L-serine biosynthesis pathway cause L-serine deficiency in the brain, resulting in diseases such as cerebellar disease, severe epilepsy, and intellectual disability [Smith et al., 1987; Boado et al., 1999; De Koning et al, 2002].

The reasons why congenital genetic defects of the L-serine biosynthesis pathway cause serious diseases of the central nervous system due to L-serine deficiency in the brain are that L-serine acts as a neurotrophic factor in neurons [Furuya et al., 2000], and that L-serine acts as a source of glycine and D-serine functioning as a co-agonist with glutamic acid for N-methyl-D-aspartate receptor (NMDAR), and thus contributes importantly to brain neurodevelopment, synapse refinement, neuronal plasticity, and excitotoxicity [De Miranda et al., 2000].

As congenital defects of the L-serine biosynthesis pathway, mutations in 3-phosphoglycerate dehydrogenase (PHGDH), phosphoserine aminotransferase (PSAT) and phosphoserine phosphatase (PSP), which are serine biosynthesis enzyme genes, are diagnosed. It was reported that 100 to 600 mg/kg/day of L-serine or a combination of 200 to 700 mg/kg of L-serine and 200 to 300 mg/kg of glycerin were administered orally to infants with defects of L-serine biosynthesis pathways for a long period of time, epilepsy and neurodevelopmental disorders were improved without side effects, and brain white matter volume and myelination were restored [Pineda et al., 2000; De Koning et al., 2002; El-Hattab, 2016]. In addition, it was reported that, when 100 to 150 mg/kg/day of L-serine was administered to adolescents having defects of the L-serine biosynthesis pathway caused by mutations in 3-phosphoglycerate dehydrogenase, it improved epilepsy, behavioral disorders, and mood disorders [Tabatabaie et al., 2011]. Therefore, it was found that externally supplying L-serine, which is deficient due to congenital defects of the L-serine biosynthesis pathway, to the body at a level necessary for the central nervous system, is an effective treatment method for related diseases.

Recently, a clinical study providing an opportunity to greatly expand the utilization of L-serine as a therapeutic agent for adult neurological diseases reported that L-serine has a positive effect on the treatment of Guamanian amyotrophic lateral sclerosis (ALS)/Parkinsonism dementia complex (PDC) and amyotrophic lateral sclerosis by β-N-methylamino-L-alanine (L-BMAA) [Dunlop et al., 2017].

Meanwhile, L-serine and magnesium play an essential role in maintaining mitochondrial function [Lucas et al., 2018; Yamanaka et al., 2016]. It has been found that formation and regulation of mitochondrial membranes plays a major role in neurogenesis and neuroplasticity, and is a major cause of various neurodevelopmental disorders related to cognitive and adjustment disorders such as autism spectrum disorder, Down's syndrome, Rett's syndrome, fragile X syndrome, etc., suggesting that activation of mitochondrial function can become a new therapeutic method [Valenti et al., 2014]. The brains of most Down's syndrome patients shows pathological findings similar to those of Alzheimer's patients, and 75% of these patients suffer from dementia when they are 50 years of age or older. It has been suggested that these findings are deeply related to mitochondrial dysfunction, and thus when treatment related to activation of mitochondrial function is started early, the incidence of dementia may be lowered [Coskun et al., 2012]. In addition, it has been reported that the occurrence of degenerative neurological diseases Alzheimer's disease [Wang et al., 2014], Parkinson's disease [Franco-Iborra et al., 2018], Huntington's disease [Farshbaf et al., 2017], and amyotropic lateral sclerosis (ALS) [Cozzolino and Carri, 2012]. It has been reported that the cause of degenerative neurological diseases such as amyotropic lateral sclerosis (ALS) [Cozzolino and Carri, 2012] results from neuronal cell death induced by oxidative stress due to mitochondrial damage. Mitochondria are organs that perform cell apoptosis or necrosis, and protect cells or repair or remove damaged cells by performing quantitative regulation of the number of mitochondria, such as mitochondrial division and fusion, to maintain cell homeostasis from external environmental stress [Youle and van der Bliek, 2012; Ni et al., 2015].

In particular, neurons are post-mitotic non-proliferating cells that require higher energy metabolism than cells of other tissues, have a high ratio of fatty acids and metal ions that are susceptible to peroxidation, and have a relatively low level of cellular antioxidants, and these neurons are very vulnerable to oxidative stress caused by reactive oxygen species or active nitrogen species [Ogawa et al., 2007; Bhat et al., 2015]. It has been reported that, due to these features of neurons, a common symptom in neurodevelopmental disorders such as autism spectrum disorder, Down's syndrome, Rett's syndrome, and fragile X syndrome, and degenerative neurological diseases such as Alzheimer's disease, Parkinson's disease, Huntington's disease, and amyotrophic lateral sclerosis, is mitochondrial dysfunction caused by oxidative stress, even though the main causes of these diseases differ from each other.

PRIOR ART DOCUMENTS

Non-Patent Documents

Aoyama K, Watabe M, Nakaki T. Regulation of neuronal glutathione synthesis. J Pharmacol sci. 2008; 108(3): 227-38.

Bhat A H, Dar K B, Anees S, Zargar M A, Masood A, Sofi M A, Ganie S A. Oxidative stress, mitochondrial dysfunction and neurodegenerative diseases; a mechanistic insight. Biomed Pharmacother. 2015; 74:101-110.

Boado R J, Li J Y, Nagaya M, Zhang C, Pardridge W M. Selective expression of the large neutral amino acid transporter at the blood-brain barrier. Proc Natl Acad Sci USA 1999; 96 (21):12079-12084.

Cozzolino M, Carrì M T. Mitochondrial dysfunction in ALS. Prog Neurobiol. 2012; 97(2): 54-66.

De Koning T J, Duran M, Van Maidergem L, Pineda M, Dorland L, Gooskens R, Jaeken J, Poll-The B T. Congenital microcephaly and seizures due to 3-phosphoglycerate dehydrogenase deficiency: outcome of treatment with amino acids. J Inherit Metab Dis. 2002; 25(2):119-125.

De Koning T J, Snell K, Duran M, Berger R, Poll-The B T, Surtees R. L-serine in disease and development. Biochem J. 2003; 371(Pt 3):653-661.

De Miranda J, Santoro A, Engelender S, Wolosker H. Human serine racemase: molecular cloning, genomic organization and functional analysis. Gene. 2000; 256 (1-2):183-8.

Doyle K M, Kennedy D, Gorman A M, Gupta S, Healy S J, Samali A. Unfolded proteins and endoplasmic reticulum stress in neurodegenerative disorders. J Cell Mol Med. 2011; 15(10): 2025-2039.

Dranka B P, Hill B G, Darley-Usmar V M. Mitochondrial reserve capacity in endothelial cells: The impact of nitric oxide and reactive oxygen species. Free Radic Biol Med. 2010; 48(7):905-914.

Dunlop R A, Powell J T, Metcalf J S, Guillemin G J, Cox P A. L-Serine-mediated neuroprotection includes the upregulation of the ER stress chaperone protein disulfide isomerase (PDI). Neurotox Res. 2017; 33(1):113-122.

El-Hattab A W. Serine biosynthesis and transport defects. Mol Genet Metab. 2016; 118(3):153-159.0

Farruggia G, Castiglioni S, Sargenti A, Marraccini C, Cazzaniga A, Merolle L, Iotti S, Cappadone C, Maier J A. Effects of supplementation with different Mg salts in cells: is there a clue? Magnes Res. 2014; 27(1):25-34.

Franco-Iborra S, Vila M, Perier C. Mitochondrial quality control in neurodegenerative diseases: Focus on Parkinson's disease and Huntington's disease. Front Neurosci. 2018; 12:342.

Furuya S, Tabata T, Mitoma J, Yamada K, Yamasaki M, Makino A, Yamamoto T, Watanabe M, Kano M, Hirabayashi Y. L-serine and glycine serve as major astroglia-derived trophic factors for cerebellar Purkinje neurons. Proc Natl Acad Sci USA. 2000; 97(21):11528-11533.

Jahnen-Dechent W, Ketteler M. Magnesium basics. Clin Kidney J 2012; 5:13-14.

Lench A M, Massey P V, Pollegioni L, Woodhall G L, Jones R S. Astroglial d-serine is the endogenous co-agonist at the presynaptic NMDA receptor in rat entorhinal cortex. Neuropharmacology. 2014; 83:118-127.

Liu G, Weinger J G, Lu Z L, et al. Efficacy and safety of MMFS-01, a synapse density enhancer, for treating cognitive impairment in older adults: a randomized, double-blind, placebo-controlled trial. J Alzheimers Dis. 2016; 49(4):971-90.

Metcalf J S, Dunlop R A, Powell J T, Banack S A, Cox P A. L-Serine: a Naturally-occurring amino acid with therapeutic potential. Neurotox Res. 2018; 33(1):213-221.

Mickley G A, Hoxha N, Luchsinger J L, et al. Chronic dietary magnesium-L-threonate speeds extinction and reduces spontaneous recovery of a conditioned taste aversion. Pharmacol Biochem Behav. 2013; 106:16-26.

Ni H M, Williams J A, Ding W X. Mitochondrial dynamics and mitochondrial quality control. *Redox Biol.* 2015; 4:6-13.

Ogawa S, Kitao Y, Hori O. Ischemia-induced neuronal cell death and stress response. *Antioxid Redox Signal.* 2007; 9(5):573-587.

Pineda M, Vilaseca M A, Artuch R, Santos S, Garcia Gonzalez M M, Aracil A, Van Schaftingen E, Jaeken J. 3-phosphoglycerate dehydrogenase deficiency in a patient with West syndrome. *Dev Med Child Neurol.* 2000; 42(9):629-633.

Pompella A, Visvikis A, Paolicchi A, De Tata V, Casini A F. The changing faces of glutathione, a cellular protagonist. Biochem Pharmacol. 2003; 66(8):1499-1503.

Romani A M P. Magnesium homeostasis in mammalian cells. Met Ions Life Sci 2013; 12: 69-118.

Saris N E L, Mervaala E, Karppanen H, Khavaja J A, Lewenstam A. An update on physiological, clinical and analytical aspects. Clin Chim Acta 2000; 294:1-26.

Shahbah D, Hassan T, Morsy S, Saadany H E, Fathy M, Al-Gobashy A, Elsamad N, Emam A, Elhewala A, Ibrahim B, Gebaly S E, Sayed H E, Ahmed H. Oral magnesium supplementation improves glycemic control and lipid profile in children with type 1 diabetes and hypomagnesaemia. Medicine (Baltimore). 2017; 96(11):e6352.

Slutsky I, Abumaria N, Wu L J, et al. Enhancement of learning and memory by elevating brain magnesium. Neuron. 2010; 65(2):165-77.

Smith Q R. Transport of glutamate and other amino acids at the blood-brain barrier. J Nutr. 2000; 130(45 Suppl): 1016S-10225.

Swaminathan R. Magnesium metabolism and its disorders. Clin Biochem Rev 2003; 24: 47-66.

Tabatabaie L, Klomp L W, Rubio-Gozalbo M E, Spaapen L J, Haagen A A, Dorland L, De Koning T J. Expanding the clinical spectrum of 3-phosphoglycerate dehydrogenase deficiency. *J Inherit Metab Dis.* 2011; 34(1): 181-184.

Valenti D, de Bari L, De Filippis B, Henrion-Caude A, Vacca R A. Mitochondrial dysfunction as a central actor in intellectual disability-related diseases: an overview of Down syndrome, autism, Fragile X and Rett syndrome. *Neurosci Biobehav Rev.* 2014; 46 Pt 2:202-217.

Vink R. Magnesium in the CNS: recent advances and developments. Magnes Res. 2016; 29(3):95-101.

Wang X, Wang W, Li L, Perry G, Lee H G, Zhu X. Oxidative stress and mitochondrial dysfunction in Alzheimer's disease. *Biochim Biophys Acta.* 2014; 1842(8):1240-1247.

Wolosker H, Panizzutti R, De Miranda J. Neurobiology through the looking-glass: D-serine as a new glial-derived transmitter. *Neurochem Int.* 2002; 41(5):327-332.

Yamanaka R, Tabata S, Shindo Y, Hotta K., Suzuki K, Soga T, Oka K. Mitochondrial Mg(2+) homeostasis decides cellular energy metabolism and vulnerability to stress. Sci Rep. 2016; 6:30027.

Youle R J, van der Bliek A M. Mitochondrial fission, fusion, and stress. Science. 2012; 337(6098): 1062-1065.

Zhou X, He L, Wu C, Zhang Y, Wu X, Yin Y. Serine alleviates oxidative stress via supporting glutathione synthesis and methionine cycle in mice. Mol Nutr Food Res. 2017; 61(11).

6

DISCLOSURE

Technical Problem

One problem to be solved by the present invention is to provide a novel magnesium-serinate compound which exhibits the effect of increasing not only the intracellular uptake of magnesium and L-serine but also the concentrations of magnesium and L-serine in the brains by simultaneously delivering magnesium and L-serine into the human body as needed, and which is useful for activation of mitochondrial function, and a production method therefor.

Another problem to be solved by the present invention is to provide a pharmaceutical composition for preventing or treating central nervous system diseases caused by mitochondrial dysfunction, such as cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis, the pharmaceutical composition containing the magnesium-serinate compound or a pharmaceutically acceptable salt thereof as an active ingredient.

Technical Solution

To solve the above-described problems, the present invention provides a compound of the following Formula (I) or a pharmaceutically acceptable salt, solvate, hydrate or isomer of the compound:

(I)

The present invention also provides a method of producing the compound of Formula (I) by reacting MgO with L-serine.

The reaction is preferably performed at a temperature of 70 to 80° C.

The present invention also provides a method of producing the compound of Formula (I) by reacting MgO with L-serine.

The reaction is preferably performed at room temperature.

The reaction is preferably performed at a temperature of 70 to 80° C.

The present invention also provides a pharmaceutical composition for preventing or treating central nervous system diseases, the pharmaceutical composition containing the compound of Formula (I) or a pharmaceutically acceptable salt thereof as an active ingredient.

The central nervous system diseases are preferably selected from the group consisting of cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis.

The present invention also provides a health functional food for preventing or alleviating central nervous system diseases, the health functional food containing the compound of Formula (I) or a pharmaceutically acceptable salt thereof as an active ingredient.

The central nervous system diseases are preferably selected from the group consisting of cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis.

The present invention also provides a feed additive composition containing the compound of Formula (I) or a pharmaceutically acceptable salt thereof.

The present invention also provides a reagent composition for inhibiting neuronal cell death, the reagent composition containing the compound of Formula (I) or a pharmaceutically acceptable salt thereof.

The present invention also provides a method for inhibiting neuronal cell death, the method comprising treating neuronal cells with the compound of Formula (I) or a pharmaceutically acceptable salt thereof in vitro.

Advantageous Effects

It has was confirmed that the novel magnesium-serinate composition obtained by the production method of the present invention consisted of about 10% magnesium and about 90% serine, as determined by instrumental analysis, was solubilized at a concentration of about 500 mg/ml in water at room temperature at a pH of 6.0 to 10.0, was maintained in an aqueous solution state without forming a precipitate, and was also solubilized at a concentration of about 500 mg/ml in phosphate-buffered saline (PBS) solution at room temperature without forming a precipitate. Thus, the novel magnesium-serinate composition has properties suitable for administration orally or by injection to the human body. In addition, the compound activates mitochondrial function and neuronal cell proliferation by increasing the oxygen consumption rate of mitochondria, and exhibits a neuronal protective effect of inhibiting neuronal cell death resulting from mitochondrial membrane potential damage and/or endoplasmic reticulum stress caused by oxidative stress, and exhibits improved blood-brain barrier permeability. Therefore, the compound has an excellent effect on the prevention, treatment and alleviation of central nervous system diseases such as cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis, and thus is a highly useful invention in the pharmaceutical industry, etc.

BEST MODE

Figure 1:
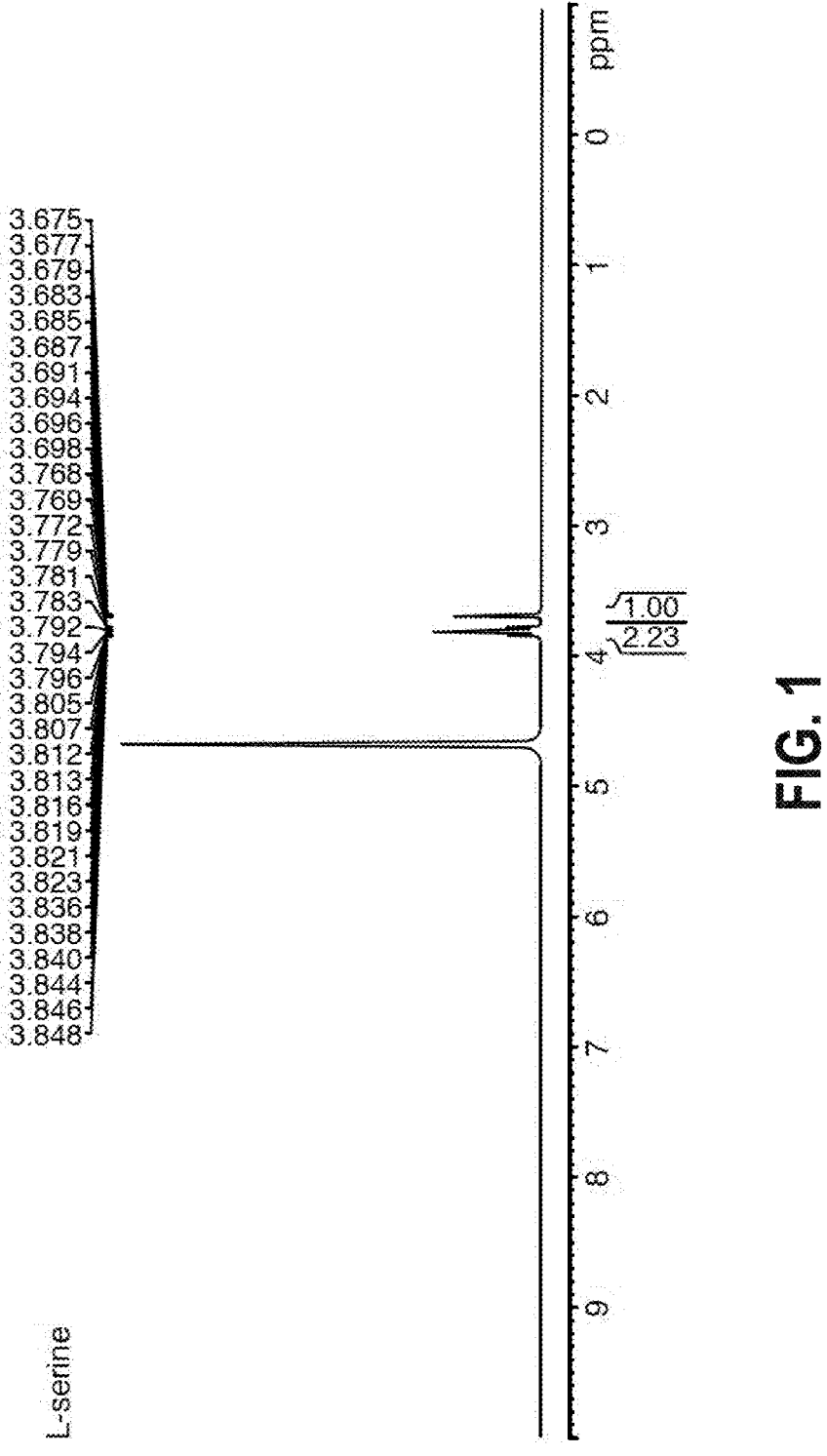
FIG. 1 shows the results of $^{1}$H-NMR analysis of L-serine.

Hereinafter, the present invention will be described in detail.

For the purpose of developing a novel compound capable of exhibiting the effect of increasing not only the intracellular uptake of magnesium and L-serine but also the concentrations of magnesium and L-serine in the brains by simultaneously delivering magnesium and L-serine into the human body as needed, the present inventors treated L-serine with a magnesium salt (MgO or MgH$_2$), thereby producing a magnesium serinate as a metal amino acid chelate in which magnesium is chelated to the amino acid L-serine. It was shown that the produced magnesium serinate was solubilized at a concentration of about 500 mg/ml in water at room temperature at a pH of 6.0 to 10.0, and was maintained in an aqueous solution state without forming a precipitate. In addition, the produced magnesium serinate was also solubilized at a concentration of 500 mg/ml in a saline solution containing sodium chloride (NaCl) and phosphate at room temperature without forming a precipitate.

Therefore, the present invention provides a compound of the following Formula (I) or a pharmaceutically acceptable salt, solvate, hydrate or isomer of the compound:

(I)

As shown in the following Structural Formula, the compound of Formula (I) has a structure in which two molecules of serine form an ionic bond and a coordinate bond with one molecule of magnesium:

The compound of Formula (I) may exist as a base-addition salt or an acid-addition salt. The addition salt is included as a part of the present invention. Although the salt is advantageously prepared with a pharmaceutically acceptable acid, for example, salts of other acids useful for purifying or isolating the compound of Formula (I) are also included as a part of the present invention. The acids may be, for example, picric acid, oxalic acid or optically active acids such as tartaric acid, dibenzoyl tartaric acid, mandelic acid or a camphorsulfonic acid, and acids which form physiologically acceptable salts such as hydrochloride, hydrobromide, sulfate, hydrogen sulfate, dihydrogen phosphate, maleate, fumarate, 2-naphthalene sulfonate or para-toluenesulfonate. For physiologically acceptable salts, reference may be made to Handbook of Pharmaceutical Salts: Properties, Selection and Use by Stahl and Wermuth (Wiley-VCH, 2002).

The solvates or hydrates may be obtained directly from the synthetic process, and the compound (I) may be isolated in the form of a hydrate, for example a mono- or hemi-hydrate or a solvate of a reaction or purification solvent.

In addition, the compound of Formula (I) may exist as an isomer, for example, as a rotational isomer. Rotational isomers of the compound of Formula (I) are included as a part of the present invention.

The compound of Formula (I) according to the present invention may be synthesized with high yield and purity by a production method as described below.

Therefore, the present invention provides a method of producing the compound of Formula (I) by reacting MgO with L-serine.

The compound of Formula (I) is synthesized according to the following reaction formula, and the synthetic reaction is preferably performed at a temperature of 70 to 80° C.:

2L-serine+MgO→Serine-Mg-Serine+$H_2$O

Specifically, the compound of Formula (I) may be obtained by adding and dissolving L-serine in a reactor containing distilled water, and adding powdered MgO at once thereto, and allowing the mixture to react with stirring for about 2 hours. A process of recovering and purifying the compound of Formula (I) in the reactor may be performed according to a general isolation and purification method after an organic synthetic reaction.

The present invention also provides a method of producing the compound of Formula (I) by reacting $MgH_2$ with L-serine.

The compound of Formula (I) is synthesized according to the following reaction formula, and the synthetic reaction is preferably performed at a temperature of 70 to 80° C.:

2L-Serine+$MgH_2$→Serine-Mg-Serine+2$H_2$

Specifically, the compound of Formula (I) may be obtained by adding L-serine to a reactor containing distilled water, adding $MgH_2$ thereto in small portions at room temperature (for room temperature reaction) or an elevated temperature of 70 to 80° C. (elevated-temperature reaction), and allowing the mixture to react stirring for about 14 hours (room temperature reaction) or about 6 hours (elevated-temperature reaction) until $H_2$ gas is not generated. A process of recovering and purifying the compound of Formula (I) in the reactor may be performed according to a general isolation and purification method after an organic synthetic reaction.

The magnesium-serinate compound of the present invention may improve the blood-brain barrier permeability of magnesium and L-serine by simultaneously delivering magnesium and L-serine into the human body as needed, and may exhibit effects against diseases related to the central nervous system, such as congenital neurological diseases and degenerative neurological diseases. Thus, the magnesium-serinate compound may be used as a pharmaceutical drug against these diseases.

Therefore, the present invention provides a pharmaceutical composition for preventing or treating central nervous system diseases, the pharmaceutical composition containing the compound of Formula (I) or a pharmaceutically acceptable salt thereof as an active ingredient.

The active ingredient of the present invention may be applied as a pharmaceutical drug against central nervous system diseases, wherein the central nervous system diseases are preferably selected from the group consisting of cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis.

The active ingredient preferably induces activation of neuronal cell proliferation. The term "activation of neuronal cell proliferation" may be understood to include both an action of promoting neuronal cell division and an action of inhibiting neuronal apoptosis or necrosis.

The activation of neuronal cell proliferation is preferably an effect obtained by increasing the oxygen consumption rate of mitochondria.

The active ingredient preferably has neuronal cell protection activity. The term "neuronal cell protection" refers to an action of inhibiting neuronal apoptosis or necrosis from being caused by external factors or cellular internal factors.

The neuronal cell protection is preferably protection from oxidative stress. The term "oxidative stress" means that cells are in an abnormal state due to reactive oxygen species.

The protection from oxidative stress is preferably achieved by inhibition of cell death caused by mitochondrial membrane potential damage.

The protection from oxidative stress is preferably achieved by inhibition of cell death caused by endoplasmic reticulum stress.

The active ingredient preferably has the ability to permeate the blood-brain barrier. The active ingredient of the present invention significantly improves the blood-brain barrier permeability of L-serine, and can be effectively delivered into the brain when administered to a patient with L-serine biosynthesis defects.

For use, the pharmaceutical composition of the present invention may be formulated in oral dosage forms such as pills, granules, tablets, capsules, suspensions, emulsions, syrups or aerosols, or other various forms such as sterile injectable solutions, depending on the intended use thereof according to conventional methods. The pharmaceutical composition may be administered orally or may be administered through various routes including intravenous, intraperitoneal, subcutaneous, rectal and topical routes.

This pharmaceutical composition may further contain carriers, excipients or diluents, and examples of suitable carriers, excipients or diluents that may be contained in the composition include lactose, dextrose, sucrose, sorbitol, mannitol, xylitol, erythritol, maltitol, starch, acacia gum, alginate, gelatin, calcium phosphate, calcium silicate, cellulose, methyl cellulose, amorphous cellulose, polyvinyl pyrrolidone, water, methylhydroxybenzoate, propylhydroxybenzoate, talc, magnesium stearate, and mineral oil.

In addition, the pharmaceutical composition of the present invention may further contain a filler, an anti-aggregating agent, a lubricant, a wetting agent, a fragrance, an emulsifier, a preservative, and the like.

The pharmaceutical composition of the present invention may be administered in a pharmaceutically effective amount. As used herein, the term "pharmaceutically effective amount" refers to an amount sufficient to treat diseases, at a reasonable benefit/risk ratio applicable to any medical treatment. The effective dosage level of the composition may be determined depending on factors, including the kind and severity of the disease of a patient, the activity of the drug, sensitivity to the drug, the time of administration, the route of administration, excretion rate, the duration of treatment, drugs used in combination with the composition, and other factors known in the medical field.

The pharmaceutical composition of the present invention may be administered individually or in combination with other therapeutic agents, and may be administered sequentially or simultaneously with conventional therapeutic agents. The pharmaceutical composition may be administered in a single or multiple dosage form. It is important to administer the composition in the minimum amount that can exhibit the maximum effect without causing side effects, in view of all the above-described factors, and this amount can be easily determined by a person skilled in the art.

In a preferred embodiment, the effective amount of the active ingredient in the pharmaceutical composition of the present invention may vary depending on the patient's age, sex and bodyweight. In general, the active ingredient may be administered at a dose of 1 to 5,000 mg/kg bodyweight/day, preferably 100 to 3,000 mg/kg bodyweight/day, daily or every other day, or may be administered one to three times a day. However, since the dose may increase or decrease depending on the route of administration, the severity of the disease, the patient's sex, bodyweight and age, etc., the dose is not intended to limit the scope of the present disclosure in any way.

The pharmaceutical composition of the present invention may be administered to a subject through various routes. All modes of administration can be contemplated. For example, the composition may be administered orally, intrarectally, or by intravenous, intramuscular, subcutaneous, intrauterine, intrathecal or intracerebroventricular injection.

In the present invention, "administration" means providing a given substance to a patient by any suitable method. The pharmaceutical composition of the present invention may be administered orally or parenterally through all general routes as long as it can reach the target tissue. In addition, the composition of the present invention may also be administered using any device capable of delivering the active ingredient to target cells.

In the present invention, the term "subject" is not particularly limited, but includes, for example, humans, monkeys, cattle, horses, sheep, pigs, chicken, turkeys, quails, cats, dogs, mice, rats, rabbits or guinea pigs, and preferably refers to mammals, more preferably humans.

In addition to being used as a pharmaceutical drug as described above, the magnesium-serinate compound of the present invention may be used as a health functional food.

Therefore, the present invention provides a health functional food for preventing or alleviating central nervous system diseases, the health functional food containing the compound of Formula (I) or a pharmaceutically acceptable salt thereof as an active ingredient.

The central nervous system diseases are preferably selected from the group consisting of cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis.

The health functional food of the present invention may be variously used in foods and beverages effective in preventing and improving diseases related to the central nervous system.

Foods containing the active ingredient of the present invention include various foods, for example, beverages, gums, teas, vitamin complexes, health supplement foods and the like, and may be used in the form of powders, granules, tablets, capsules or beverages.

The active ingredient of the present invention may generally be added in an amount of 0.01 to 15 wt % based on the total food weight. For a health beverage composition, the active ingredient may be added in an amount of 0.02 to 10 g, preferably 0.3 to 1 g, based on 100 ml of the health beverage composition.

The health functional food of the present invention may additionally contain food-acceptable additives, for example, natural carbohydrates and various flavoring agents, in addition to containing the compound as an essential component at the indicated percentage.

Examples of the natural carbohydrates include conventional sugars, such as monosaccharides (e.g., glucose, fructose, etc.), disaccharides (e.g., maltose, sucrose, etc.), polysaccharides (e.g., dextrin, cyclodextrin, etc.), and sugar alcohols such as xylitol, sorbitol, erythritol or the like.

Examples of the flavoring agents that may be used in the present invention include thaumatin, rebaudioside A, glycyrrhizin, saccharin, aspartame, etc. The flavoring agent is used in an amount of about 1 to 20 g, preferably about 5 to 12 g, based on 100 mL of the health functional food of the present invention.

In addition, the health functional food of the present invention may contain various nutrients, vitamins, minerals, flavoring agents such as synthetic flavoring agents and natural flavoring agents, colorants, extenders, pectic acid and its salt, alginic acid and its salt, organic acids, protective colloidal thickeners, pH adjusting agents, stabilizers, preservatives, glycerin, alcohol, carbonizing agents as used in carbonated beverages, etc.

Additionally, the health functional food of the present invention may contain fruit flesh that is used for the preparation of natural fruit juice, fruit juice beverages or vegetable beverages. These components may be used individually or in combination. The content of these additives is generally selected in the range of 0.01 to about 20 parts by weight based on 100 parts by weight of the health functional food.

Since the magnesium-serinate compound of the present invention may effectively supply magnesium and serine into a living body, it may be applied to feed.

Therefore, the present invention provides a feed additive composition containing the compound of Formula (I) or a pharmaceutically acceptable salt thereof.

The feed additive composition may be for animals. The "animals" refers to a group of organisms corresponding to plants, which consumes organic matter as nutrients and in which digestive, excretory and respiratory organs are differentiated. Specifically, the animals may be echinoderms, crustaceans, mollusks, fish, amphibians, reptiles, birds, or mammals. Preferably, the animals are echinoderms such as sea urchins or sea cucumbers; arthropods including crustaceans such as crab, shrimp, and Chinese white shrimp; mollusks such as cephalopods, gastropods, or bivalve; fish such as red bream, sea bream, cod, or halibut or flatfish; birds including poultry such as pheasant or chicken; or mammals such as pigs, cattle, sheep, horses, goats, dogs, or cats.

The feed additive composition may further contain grains, vegetable protein feed, animal protein feed, sugar or a dairy product, in addition to the active ingredient of the present invention. The grains may specifically be ground or crushed wheat, oats, barley, corn and rice; the vegetable protein feed may specifically be based on rapeseed, soybean and sunflower; the animal protein feed may specifically be blood meal, meat meal, bone meal and fish meal; and the sugar or dairy product may specifically be a dry component consisting of various milk powders and whey powders.

The food additive composition may further contain components such as nutritional supplements, digestion and absorption enhancers, growth promoters or disease preventive agents.

The feed additive composition of the present invention may vary depending on the purpose of use and conditions of use of feed. For example, the feed additive composition may be contained in an amount of 0.1 to 100 g based on 1 kg of finally produced feed.

In addition, the feed additive composition may be prepared into consistent viscous coarse or granular materials according to the degree of pulverization of the components thereof. The composition may be supplied as a mesh or may be formed into a desired separate shape for further processing and packaging, and may be subjected to pelletization, expansion or extrusion processes for storage. For the easiness of storage, an excess amount of water may preferably be removed from the composition by drying.

Meanwhile, since the magnesium-serinate of the present invention effectively inhibits neuronal cell death, it may be applied as a reagent for inducing cell death in cells, preferably neuronal cells.

Therefore, the present invention provides a reagent composition for research, preferably a reagent composition for inhibiting neuronal cell death, the reagent composition containing the compound of Formula (I) or a pharmaceutically acceptable salt thereof.

The neuronal cells may be primary neuronal cells, transformed neuronal cells, or neuronal cell lines.

The reagent may be used for activation of neuronal cells, activation of neuronal cell proliferation by increased oxygen consumption rate of mitochondria, protection of neuronal cells, inhibition of neuronal cell damage caused by oxidative stress, inhibition of neuronal cell death resulting from mitochondrial membrane potential damage caused by oxidative stress, or inhibition of neuronal cell death resulting from endoplasmic reticulum stress caused by oxidative stress.

The present invention also provides a method for inhibiting neuronal cell death, the method comprising treating neuronal cells with the reagent of the present invention, which contains the compound of Formula (I) or a pharmaceutically acceptable salt thereof.

According to the above method, it is possible to obtain effects of activation of neuronal cells, activation of neuronal cell proliferation by increased oxygen consumption rate of mitochondria, protection of neuronal cells, inhibition of neuronal cell damage caused by oxidative stress, inhibition of neuronal cell death resulting from mitochondrial membrane potential damage caused by oxidative stress, or inhibition of neuronal cell death resulting from endoplasmic reticulum stress caused by oxidative stress.

In the above method, a method for cell culture method, a method for treatment with the reagent, etc. are matters that are obvious to those of ordinary skill in the art. In particular, the treatment concentration of the reagent, etc., may be appropriately modified within the range of matters described in the present specification or within a range in which the effect of the reagent does not change.

The method is preferably performed in vitro.

MODE FOR INVENTION

Hereafter, the present invention will be described in more detail with reference to specific examples. The following examples describe one preferred embodiment of the present invention, and it is to be understood that the scope of the present invention is not limited by the contents described in the following examples.

Examples

1. Production of Mg-Serinate
1.1. Production of Mg-Serinate (AST-011)

100 ml of distilled water was placed in a 500-ml Erlenmeyer flask, and heated to a temperature of 70 to 80° C., and then 50 g (about 0.48 moles) of L-serine (MW: 105.1) was weighed and dissolved in the distilled water with stirring with a magnetic stirrer. MgO (MW: 40.3) was pulverized into small particles in a mortar, and then 9.7 g (about 0.24 moles) of the MgO particles were added in small portions to the aqueous solution of L-serine with stirring at a temperature of 70 to 80° C. Then, the mixture was allowed to react in an Erlenmeyer flask equipped with a reflux condenser for 2 hours under the same conditions.

The reaction solution in a non-cooled state was immediately centrifuged at 6,000 rpm for 10 minutes, and 130 ml of the supernatant was collected. Ethanol was added to the supernatant to a final concentration of 75 v/v %, and the mixture was stirred with a magnetic stirrer at room temperature for 14 hours to form a precipitate. The supernatant was removed by decantation, and only the precipitate was recovered and freeze-dried to obtain a magnesium-serinate solid.

The magnesium-serinate solid recovered by freeze-drying was pulverized into small particles in a mortar to finally obtain magnesium-serinate powder (AST-011). The obtained magnesium-serinate powder was weighed 53.1 g and the yield thereof was about 89%.

1.2. Production of Mg-Serinate (AST-014) by Room-Temperature Reaction 500 ml of distilled water was placed in an Erlenmeyer flask (2,000 ml), and 75 g (about 0.71 moles) of L-serine (MW: 105.1) was weighed and dissolved in the distilled water with stirring at room temperature. 9.5 g (about 0.36 moles) of $MgH_2$ (MW: 26.3) was weighed and added in small portions to the aqueous solution of L-serine with stirring at room temperature. The mixture was allowed to react with stirring with a magnetic stirrer at room temperature for 14 hours until $H_2$ gas was not generated.

The reaction solution was filtered through filter paper (Whatman 3MM Filter Paper, GE Healthcare, Life Sciences, USA), and the filtrate was concentrated to a volume of about 200 ml using a vacuum concentrator (Heidolph LR 4000, Germany). 600 ml of ethanol was added to the concentrate (about 200 ml) to a final concentration of 75 v/v % and stirred with a magnetic stirrer for 14 hours to form a precipitate. Then, the supernatant was removed by decantation, and the precipitate was recovered as magnesium-serinate and freeze-dried.

The magnesium-serinate solid recovered by freeze-drying was pulverized into small particles in a mortar to finally allowed to react in an Erlenmeyer flask equipped with a reflux condenser while it was stirred with a magnetic stirrer at the same temperature of 70 to 80° C. for 6 hours until $H_2$ gas was not generated.

The reaction solution was filtered through filter paper (Whatman 3MM Filter Paper, GE Healthcare, Life Sciences, USA), and about 220 ml of the filtrate was concentrated to a volume of about 100 ml using a vacuum concentrator (Heidolph LR 4000, Germany). Ethanol was added to the concentrate (about 100 ml) to a final concentration of 75 v/v % and stirred with a magnetic stirrer for 14 hours to form a precipitate. Then, the supernatant was removed by decantation, and the precipitate was washed by immersion in 300 ml of 75 v/v % ethanol for 8 hours, and then freeze-dried to obtain magnesium-serinate.

The magnesium-serinate solid recovered by freeze-drying was pulverized into small particles in a mortar to finally obtain magnesium-serinate powder (AST-016). The obtained magnesium-serinate powder was weighed 62.6 g and the yield thereof was about 92.8%.

2. Instrumental Analysis of Synthesized Magnesium-Serinate 2.1. Analysis of Magnesium Content in Magnesium-Serinate The magnesium content of each chelate compound was analyzed by inductively coupled plasma-optical emission spectrometry (ICP-OES) (Optima 7300DV, PerkinElmer, USA). As experimental conditions, a frequency of 40 MHz was used, and a wavelength of 285.213 nm was used for inorganic analysis.

(1) About 0.1 to 0.2 g of each sample was taken and weighed accurately, and then 25 to 30 g of nitric acid was added thereto.

(2) The mixture was treated using an UltraWAVE (Milestone, Italy) device at 220° C. for 25 minutes, and then diluted with 2% nitric acid and analyzed.

The average values of the analysis are shown in Table 1 below.

TABLE 1

| | | Weight (g) of nitric acid solution added | Weight of smaple taken off after pretreatment | Weight (g) of 2% nitric acid solution added | Concentration (%) of magnesium in sample | MG content (%) excluding water | Average Mg content (%) |
|---|---|---|---|---|---|---|---|
| Samples | Sample weight (g) | | | | | | |
| AST-011 | 0.17 | 30.55 | 1.11 | 24.98 | 8.15 | 9.62 | 9.63 |
| | 0.10 | 29.77 | 1.11 | 29.77 | 8.16 | 9.63 | |
| AST-014 | 0.15 | 27.90 | 1.12 | 48.53 | 8.68 | 10.21 | 10.06 |
| | 0.12 | 30.75 | 1.11 | 48.41 | 8.28 | 9.90 | |
| AST-016 | 0.21 | 25.85 | 1.10 | 49.09 | 8.95 | 10.59 | 10.77 |
| | 0.12 | 27.40 | 1.04 | 49.96 | 9.26 | 10.95 | | obtain magnesium-serinate powder (AST-014). The obtained magnesium-serinate powder was weighed 48.3 g and the yield thereof was about 57.3%.

1.3. Production of Mg-Serinate (AST-016) by Elevated-Temperature Reaction 200 ml of distilled water was placed in an Erlenmeyer flask (1,000 ml) and pre-heated to 70 to 80° C. 60 g (about 0.57 moles) of L-serine (MW: 105.1) was weighed and dissolved in the heated distilled water with stirring. 7.5 g (about 0.285 moles) of $MgH_2$ (MW: 26.3) was weighed and added in small portions to the aqueous solution of L-serine with stirring with a magnetic stirrer. Then, the mixture was 2.2. Analysis of Contents of Constituent Amino Acids in Magnesium-Serinate The contents of constituent amino acids in each magnesium-serinate were analyzed using an automatic amino acid analyzer (L-8900, Hitachi, Japan).

(1) 0.05 g of each sample was added to 2 ml of 6N HCl and hydrolyzed at 110° C. for 24 hours under a nitrogen atmosphere.

(2) After acid hydrolysis, the solution was dried by heating at 80° C. for about 24 hours.

(3) The acid-hydrolyzed solution was diluted 1,000-fold with 0.02N HCl, and then analyzed by an automatic amino acid analyzer.

The results of the analysis are shown in Table 2 below.

TABLE 2

| Serine contents of magnesium-serinate AST-011, AST-014 and AST-016 | | | |
| --- | --- | --- | --- |
| Amino acid | AST-011 (mg/g) | AST-014 (mg/g) | AST-016 (mg/g) |
| Aspartic acid | ND | ND | ND |
| Threonine | ND | ND | ND |
| Serine | 890.1 | 890.5 | 895.1 |
| Glutamic acid | ND | ND | ND |
| Glycine | ND | ND | ND |
| Alanine | ND | ND | ND |
| Cystine | ND | ND | ND |
| Valine | ND | ND | ND |
| Methionine | ND | ND | ND |
| Isoleucine | ND | ND | ND |
| Leucine | ND | ND | ND |
| Tyrosine | ND | ND | ND |
| Phenylalanine | ND | ND | ND |
| Lysine | ND | ND | ND |
| Ammonia | ND | ND | ND |
| Histi,line | ND | ND | ND |
| Arginine | ND | ND | ND |
| Proline | ND | ND | ND |

ND: Non-detect

2.3. Analysis of Magnesium-Serinate by Nuclear Magnetic Resonance (NMR)

Each of the magnesium-serinate samples (AST-011, AST-014 and AST-016) and authentic L-serine (ICN Biomedicals, OH, USA) was analyzed by $^1$H NMR and $^{13}$C NMR. 100 mg of each sample was dissolved in 0.7 ml of $D_2O$ and analyzed using NMR spectroscopy (Bruker Avance II 500 MHz with CyroBBO probe, Bruker, Germany) at 24.85° C. (298 K).

2.3.1. $^1$H NMR Analysis

Figure 2:
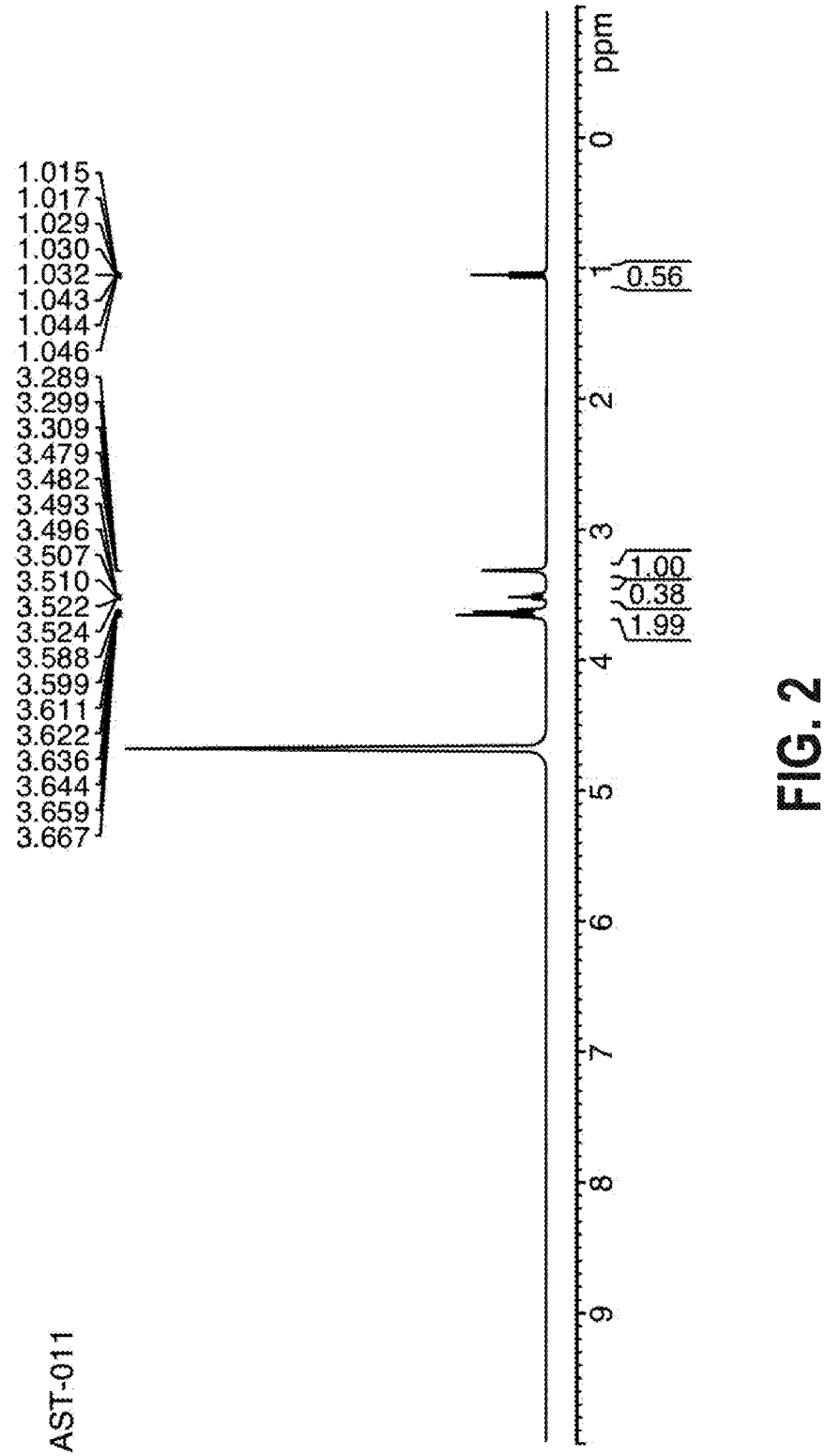
FIG. 2 shows the results of $^{1}$H-NMR analysis of the magnesium-serinate (a compound obtained according to a synthesis method described in Example 1 below; hereinafter referred to as "AST-011") of the present invention.
Figure 3:
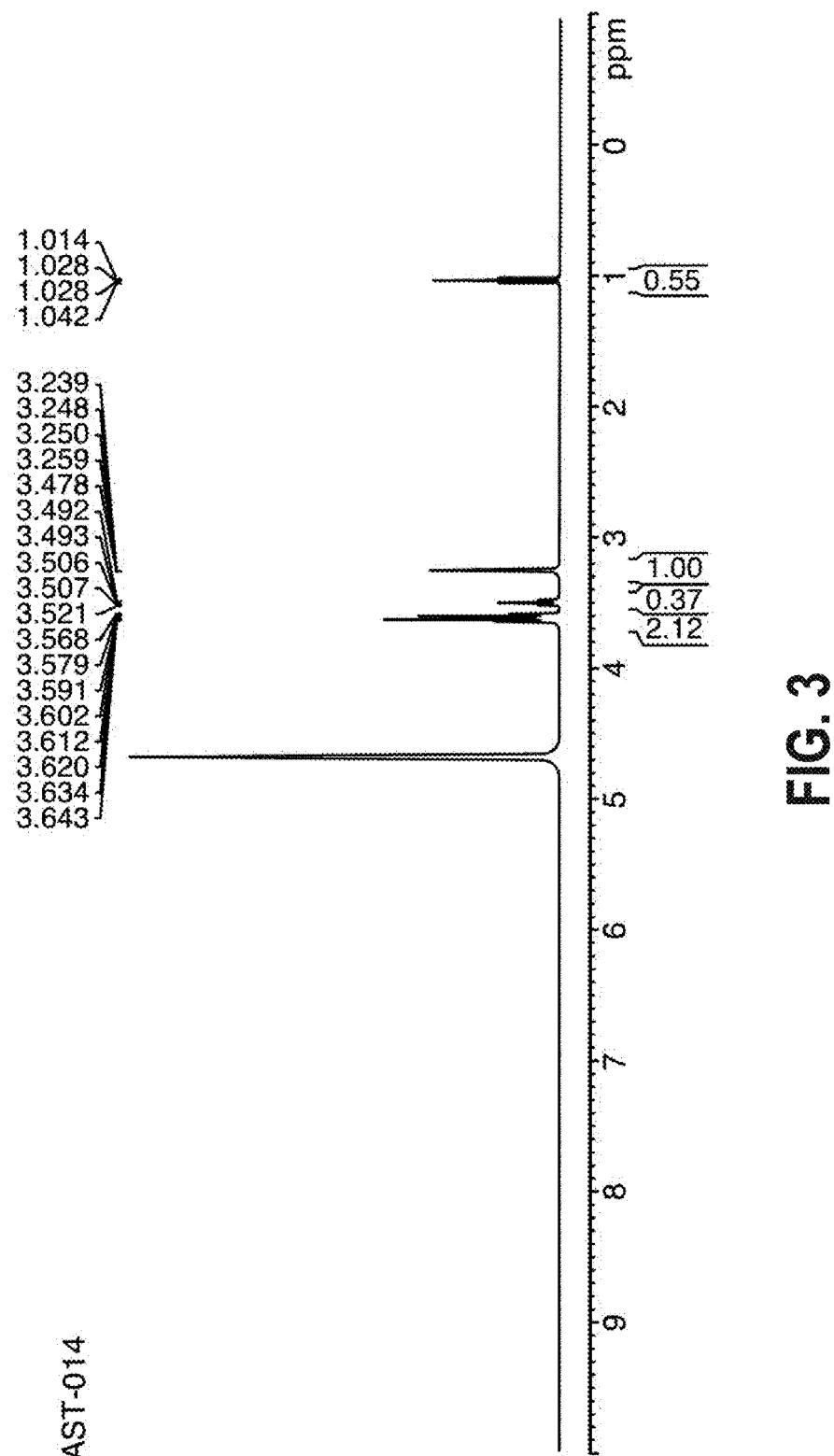
FIG. 3 shows the results of $^{1}$H-NMR analysis of the magnesium-serinate (a compound obtained according to a synthesis method described in Example 2 below; hereinafter referred to as "AST-014") of the present invention.

As shown in FIGS. 1 to 3 showing the results of $^1$H NMR analysis, in the case of authentic L-serine, the peak considered as α-carbon having a carboxyl group and an amino group appeared at 3.7 to 3.8 ppm, and the peak considered as β-carbon having a hydroxyl group appeared at 3.6 to 3.7 ppm. In the case of AST-011, the peak considered as α-carbon having a carboxyl group and an amino group appeared at 3.5 to 3.6 ppm, and the peak considered as β-carbon having a hydroxyl group appeared at 3.2 ppm, and in the case of AST-014, the peak considered as α-carbon having a carboxyl group and an amino group appeared at 3.5 to 3.6 ppm, and the peak considered as β-carbon having a hydroxyl group appeared at 3.2 ppm.

In conclusion, $^1$H NMR peaks having a chemical shift similar to that of authentic L-serine were found commonly in the two samples (AST-011 and AST-014). Unlike the $^1$H NMR peaks of authentic L-serine, in the case of AST-011 and AST-014, the $CH_2$ peak of ethanol was found at 3.4 to 3.5 ppm, and the $CH_3$ peak of ethanol was found at 1.00 ppm. This is believed to be because the ethanol used in the ethanol precipitation step during the production process of each of AST-011 and AST-014 remained in a small amount in the solid sample even after freeze-drying.

2.3.2. $^{13}$C NMR Analysis

Figure 4:
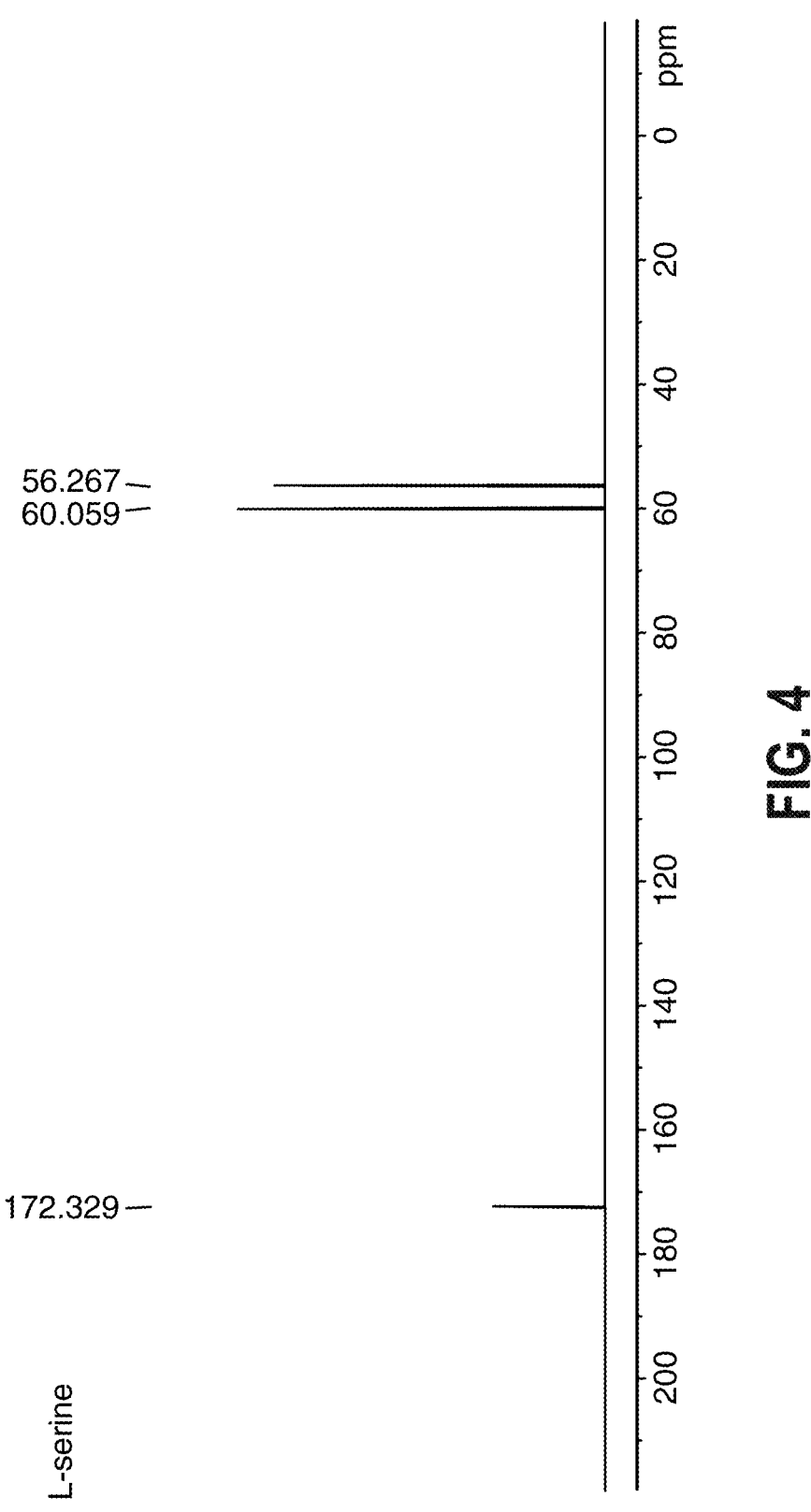
FIG. 4 shows the results of $^{13}$C-NMR analysis of L-serine.
Figure 5:
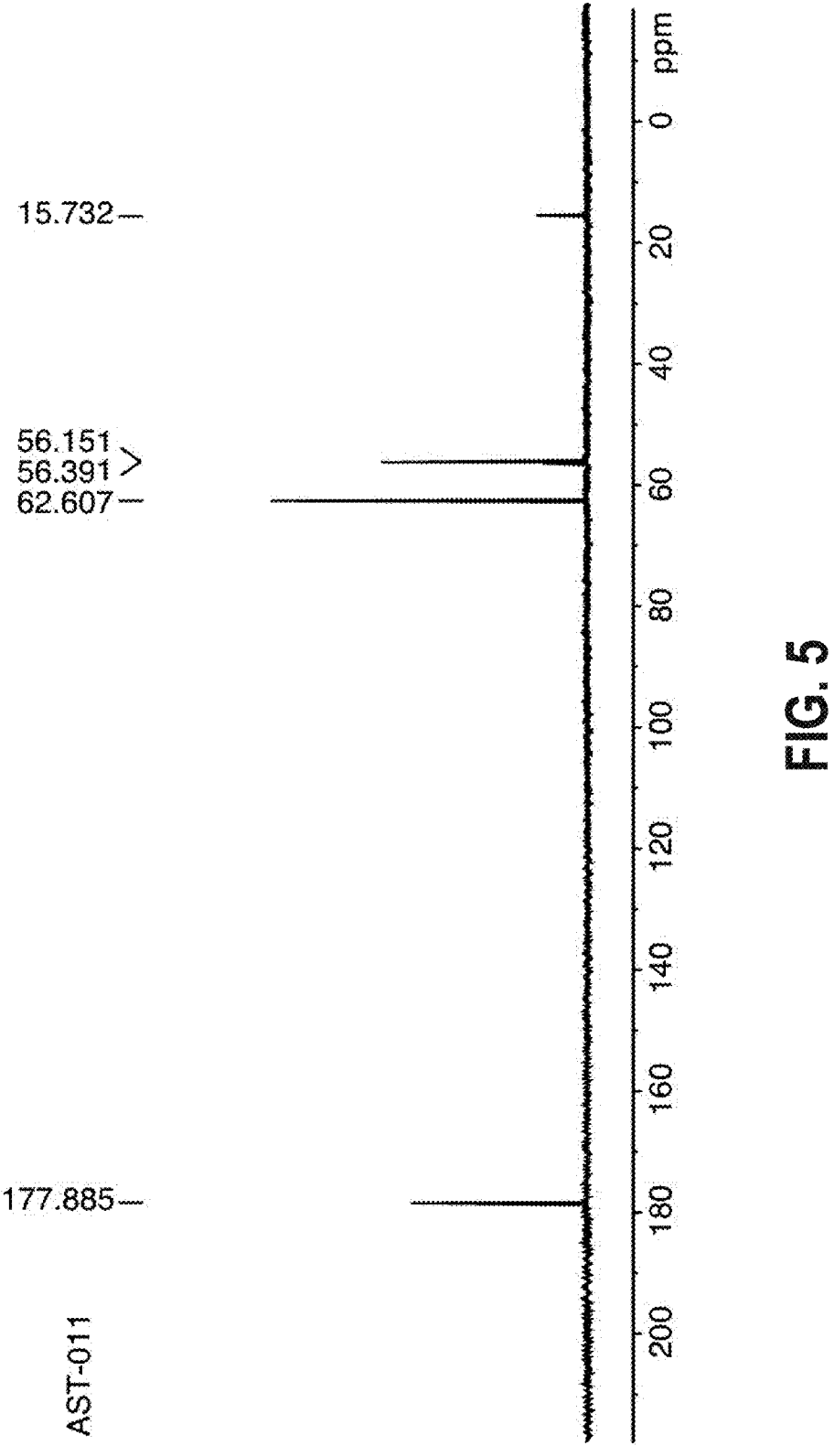
FIG. 5 shows the results of $^{13}$C-NMR analysis of the magnesium-serinate (AST-011) of the present invention.
Figure 6:
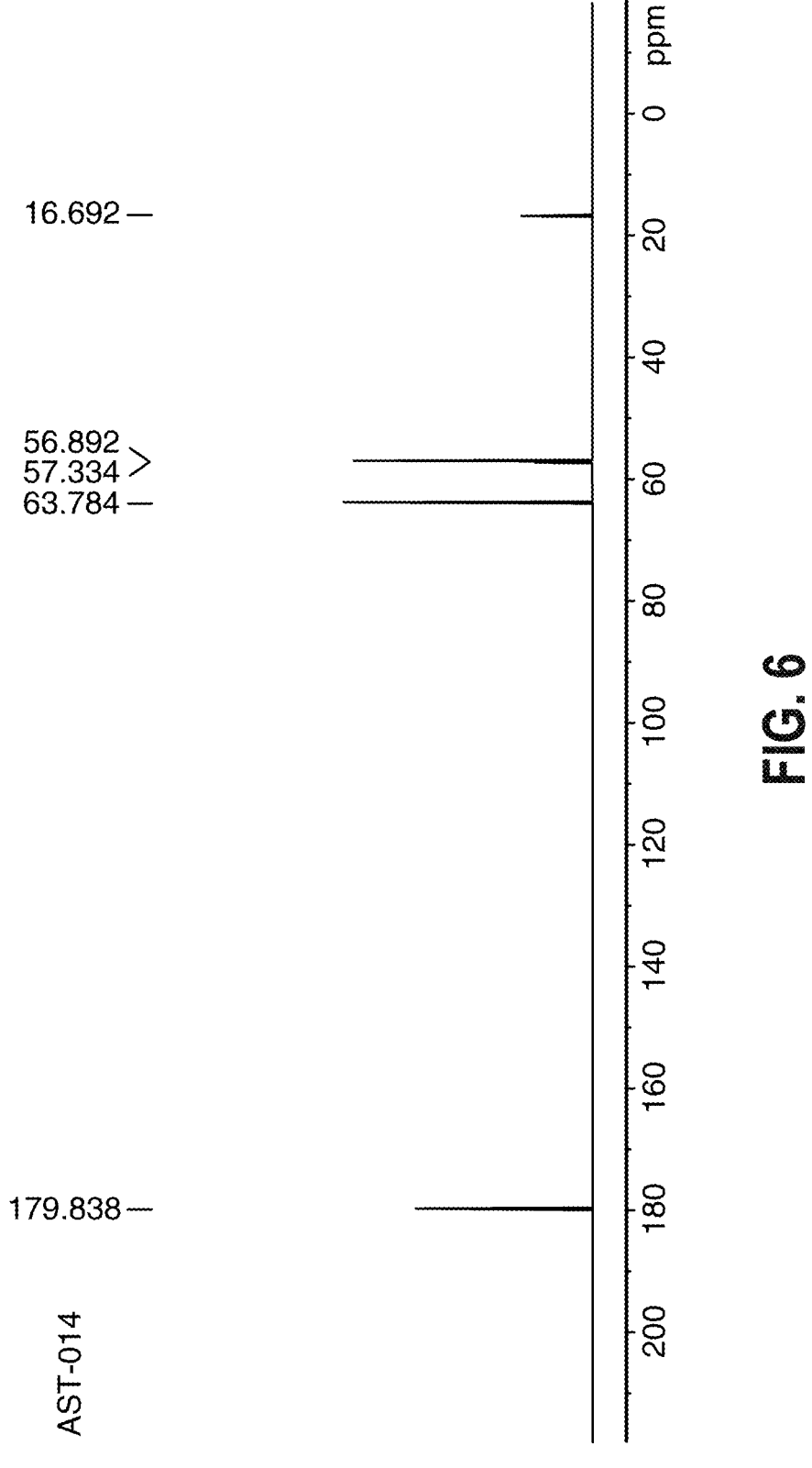
FIG. 6 shows the results of $^{13}$C-NMR analysis of the magnesium-serinate (AST-014) of the present invention.

As shown in FIGS. 4 to 6 showing the results of $^{13}$C NMR analysis, in the case of AST-011, the C=O peak considered as the carboxyl group of α-carbon in authentic L-serine appeared at 177.885 ppm, the C—O peak of the hydroxyl group of β-carbon appeared at 62.607 ppm, and the C—C peak of α-carbon and β-carbon appeared at 56.151 ppm. In addition, in the case of AST-014, it was confirmed that the C=O peak considered as the carboxyl group of α-carbon appeared at 179.838 ppm, the C—O peak of the hydroxyl group of β-carbon appeared at 63.784 ppm, and the C—C peak of α-carbon and β-carbon appeared at 56.892 ppm.

In conclusion, $^{13}$C NMR peaks similar to those of authentic L-serine were found commonly in the two samples (AST-011 and AST-014). Meanwhile, it was confirmed that small height peaks, which appeared at 56.391 ppm and 15.732 ppm for AST-011 and 57.334 ppm and 16.692 ppm for AST-014, were ethanol peaks which were also detected in the $^1$H NMR analysis.

2.3.3. NMR Analysis Results

When the results of the two analyses performed using $^1$H NMR and $^{13}$C NMR, respectively, it can be confirmed that the produced magnesium-serinate samples (AST-011 and AST-014) contain L-serine.

2.4. Analysis of Magnesium-Serinate by Fourier Transform Infrared (FT-IR) Spectroscopy Each of the magnesium-serinate samples (AST-011, AST-014 and AST-016) and authentic L-serine (ICN Biomedicals, OH, USA) was analyzed using an FT-UV-VIS-IR Spectroscopic Imaging Microscope (Vertex 80, Bruker, Germany). Based on the results of the analysis, an examination was made of whether or not the produced magnesium-serinate compounds were synthesized as chelate compounds.

At this time, 30 to 40 mg of each sample was measured and analyzed in triplicate at a resolution of 4 cm$^{-1}$ using an ATR (Attenuated Total Reflectance) technique. The spectral range was 600 to 4,000 cm$^{-1}$, and a DLaTGS detector was used.

Figure 7:
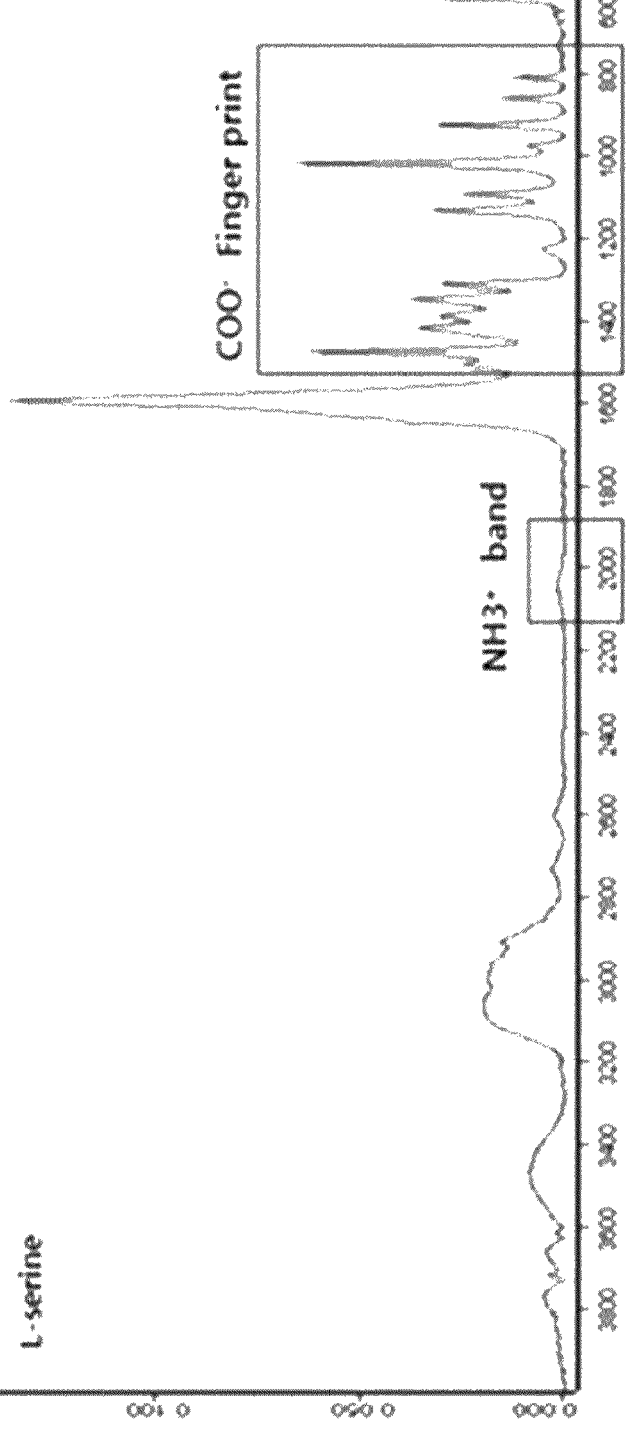
FIG. 7 shows the results of FT-IR analysis of L-serine.
Figure 8:
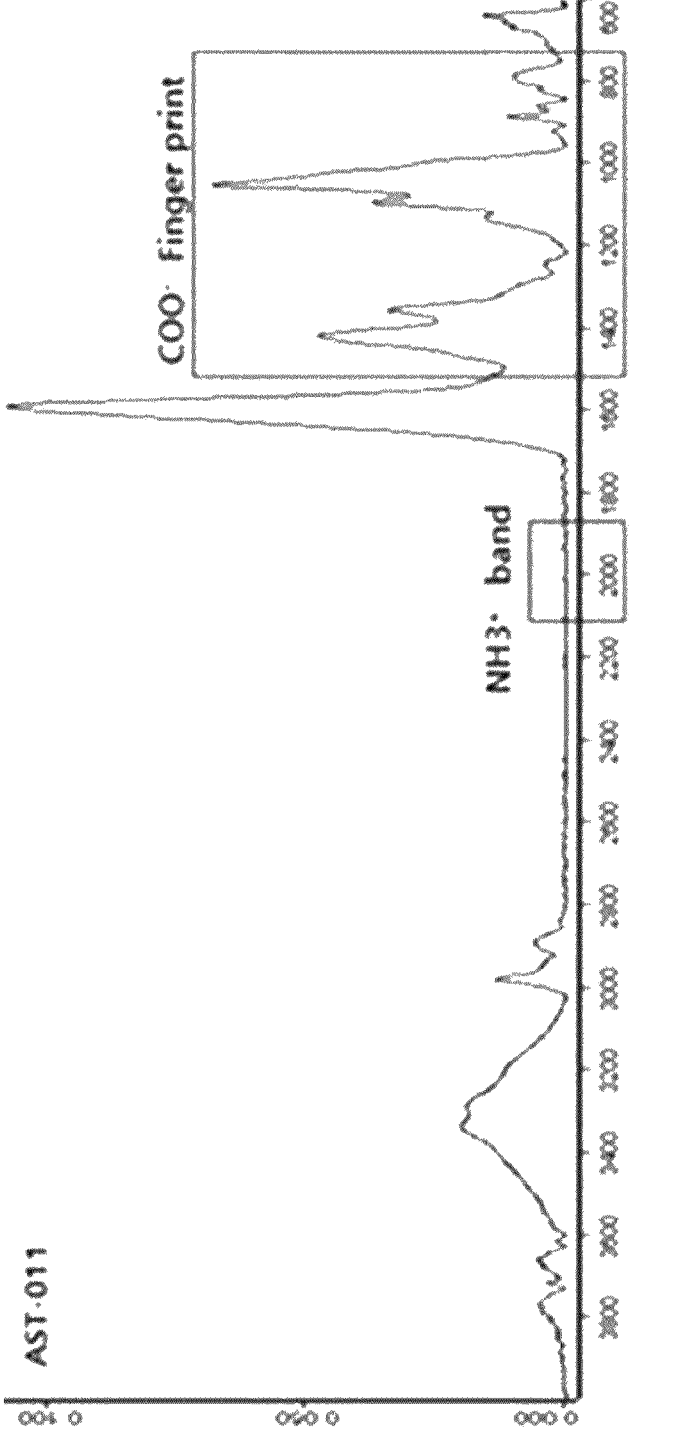
FIG. 8 shows the results of FT-IR analysis of the magnesium-serinate (AST-011) of the present invention.
Figure 9:
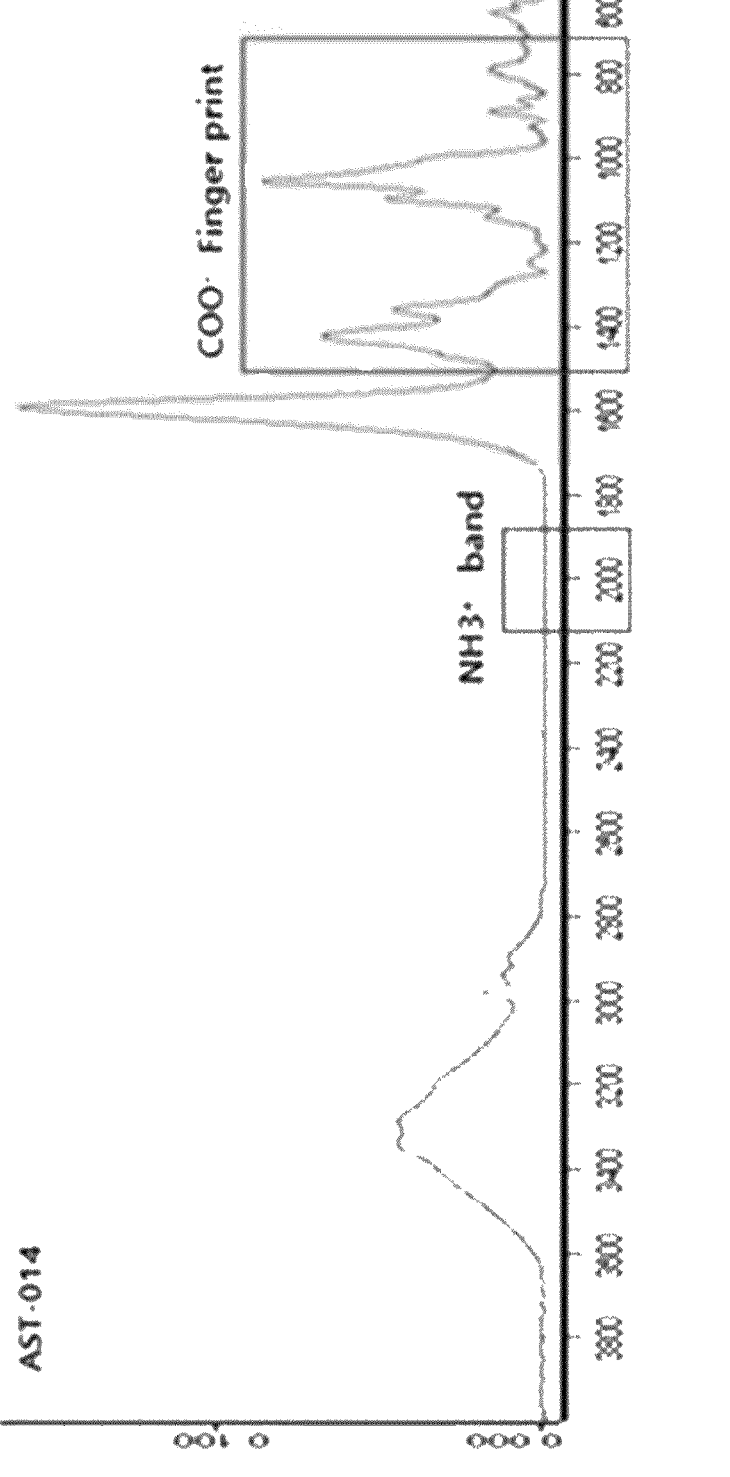
FIG. 9 shows the results of FT-IR analysis of the magnesium-serinate (AST-014) of the present invention.
Figure 10:
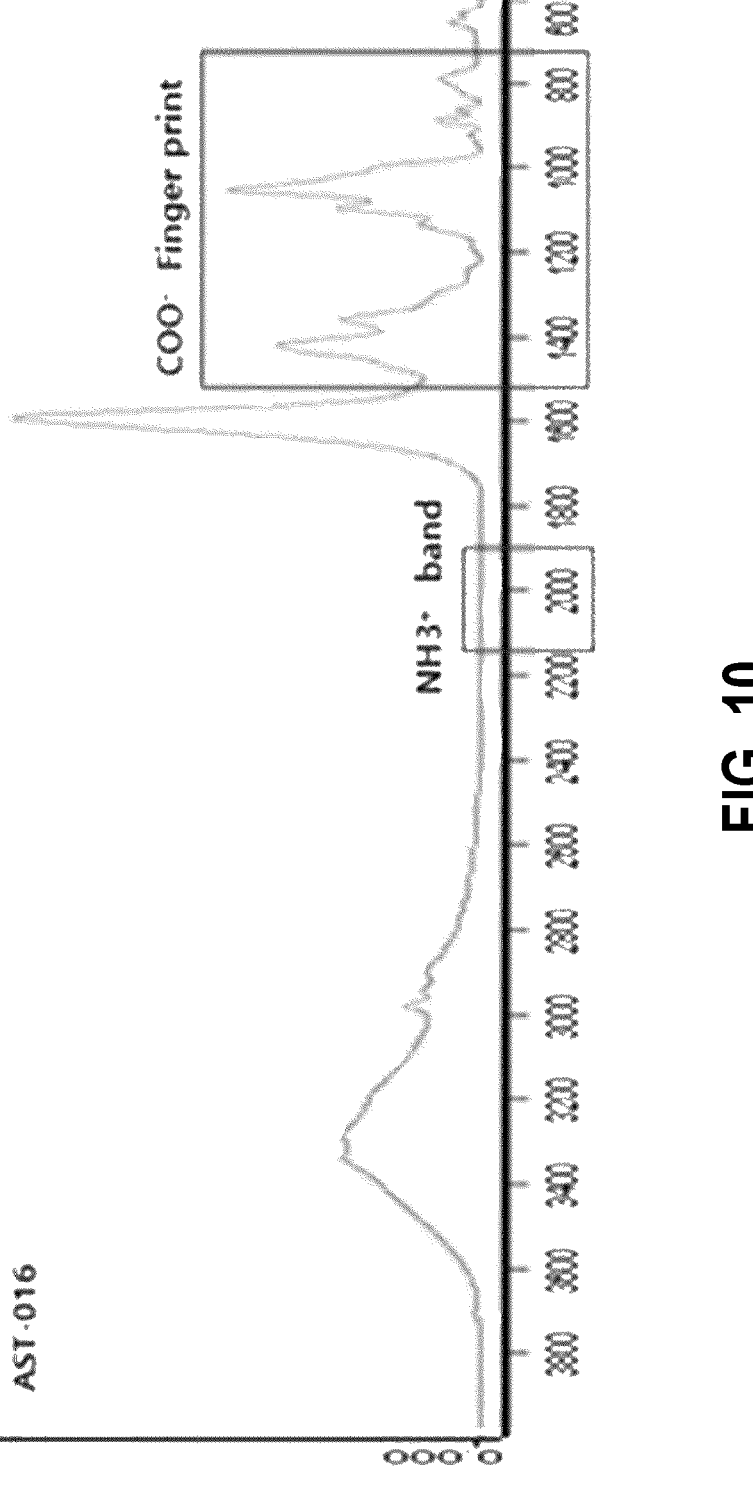
FIG. 10 shows the results of FT-IR analysis of the magnesium-serinate (a compound obtained according to a synthesis method described in Example 3 below; hereinafter referred to as "AST-016") of the present invention.

FIG. 7 shows the results of IR analysis performed using L-serine alone as a control. It was confirmed that the finger print indicating —COO$^-$ due to the influence of zwitterions appeared at 800 to 1,400 cm$^{-1}$ and 1600 cm$^{-1}$, and the characteristic band of —NH$^{3+}$ was formed at about 2,100 cm$^{-1}$. When comparing these results with the results in FIGS. 8 to 10, it was confirmed that the —COO$^-$ finger print formed at 800 to 1400 cm$^{-1}$ was changed and separated into several peaks, and in particular, the peak formed at about 2100 cm$^{-1}$ indicating the characteristic band of —NH$^{3+}$ completely disappeared.

From the results of the FT-IR analysis performed as described above, it was indirectly confirmed through the changes in the peaks of the amine group and carboxyl group of L-serine that the two functional groups are all organically involved in bonding with magnesium.

3. Evaluation of Neuronal Cell Proliferation Activity of Magnesium-Serinate

3.1. Cell Viability Assay

Cell culture reagents, including Dulbecco's Modified Eagle Medium (DMEM), fetal bovine serum (FBS), 4-(2-hydroxyethyl)piperazine-1-ethanesulfonic acid (HEPES) and streptomycin-penicillin, were purchased from Gibco BRL (Grand Island, USA).

Murine hippocampal neuronal cell line HT-22 was cultured in Dulbecco's Modified Eagle's Medium (DMEM) supplemented with 10% fetal bovine serum (FBS) and 100 μg/ml gentamycin at 37° C. under a 5% $CO_2$ atmosphere. In this Example, cells at passage 15 or below were used.

Cell proliferation activity was examined by an MTT assay for measuring cell viability. First, hippocampal neuronal cell HT-22 ($1 \times 10^4$ cells) was incubated with each of serially diluted sample solutions in 96-well plates for 16 hours, and then mixed with 50 µl of MTT (3-(4,5-dimethyl thiazolyl) 2,5-diphenyl tetrazolium bromide) solution (1.1 mg/ml), followed by additional incubation for 4 hours. The formed formazan crystal was dissolved in 150 µl of DMSO solution, and the optical density (OD) at 540 nm was measured using a plate reader.

3.2. Results of Evaluation of Neuronal Cell Proliferation Activity

Figure 11:
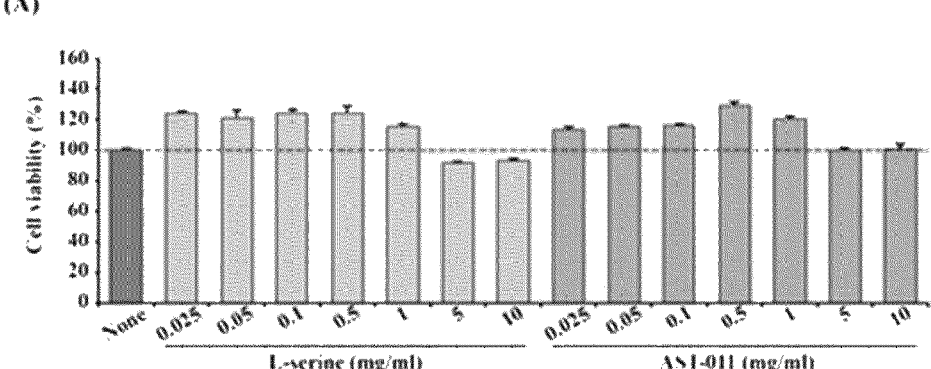
FIG. 11 shows the cell viability of mouse hippocampal neuronal HT-22 cells as a function of the treatment concentration of the magnesium-serinate (AST-011) of the present invention. (A) shows cell viability in serine/glycerin-deficient medium, and (B) shows cell viability in complete medium.
Figure 11:
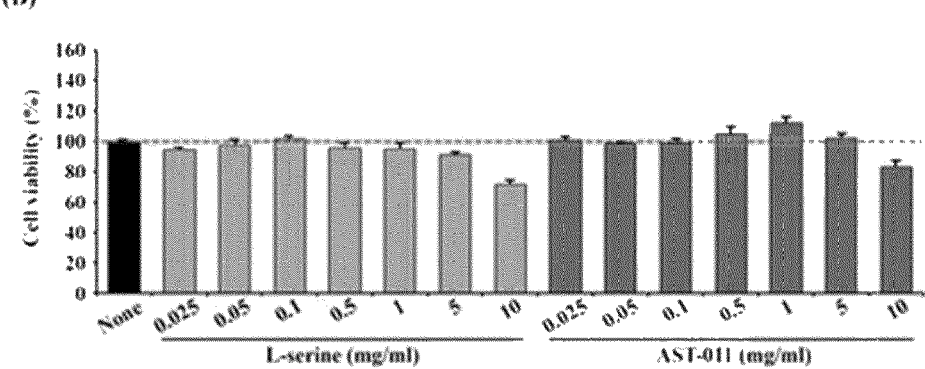

To evaluate the neuronal cell proliferation activity of the selected magnesium-serinate (AST-011) of the present invention, the comparison of cell proliferation activity between AST-011 and L-serine as a control was performed by adding each substance (25 to 10,000 µg). As a result, as shown in FIG. 11, it was confirmed that, in complete medium, L-serine did not significantly activate cell proliferation, whereas AST-011 showed a cell viability of up to 112% at a treatment concentration of 1 mg/ml (FIG. 11B). In addition, in serine/glycerin-deficient medium, while L-serine showed a cell viability of 125% at a treatment concentration of 500 µg/ml, AST-011 showed a cell viability of 129% (FIG. 11A), indicating that the AST-011 drug activates hippocampal HT-22 cell proliferation.

4. Evaluation of Effect of Magnesium-Serinate on Mitochondrial Oxygen Consumption Rate 4.1. Seahorse XF Cell Mito Stress Test The effect of each of serine and magnesium-serinate (AST-011) on the oxygen consumption rate (OCR) of mitochondria in the hippocampal neuron cell line HT-22 was evaluated using the Seahorse XF Cell Mito Stress Test (Seahorse, Agilent Technologies, Santa Clara, CA). All procedures were performed according to the protocol of the Mito Stress Test Kit. First, hippocampal neuronal HT-22 cells were seeded into an XP-96 cell culture plate at a density of $8 \times 10^3$ cells/well, and then incubated in DMEM medium in a $CO_2$ incubator at 37° C. for 12 hours. Then, the cells were treated with various concentrations of each of serine and the AST-011 drug. 4 hours after drug treatment, the medium was replaced with fresh medium, and the cells were further incubated in a $CO_2$ incubator at 37° C. for 12 hours. After 12 hours of incubation, the cells were washed twice with assay medium (10 mM glucose, 1 mM pyruvate, 2 mM glutamine, pH 7.4), and 180 µl of medium was added thereto. Then, the cells were incubated in a non-$CO_2$ incubator at 37° C. for 1 hour, and analyzed by a Seahorse extracellular flux (XF) analyzer. For OCR measurement, the cells were treated with 1 µM oligomycin, 0.5 µM fluorocarbonyl cyanide phenylhydrazone (FCCP) and 0.5 µM rotenone/antimycin A. The experiment was performed in three identical wells for each sample, and the results were obtained as average values.

4.2. Results of Evaluation of Mitochondrial Oxygen Consumption Rate

Figure 12:
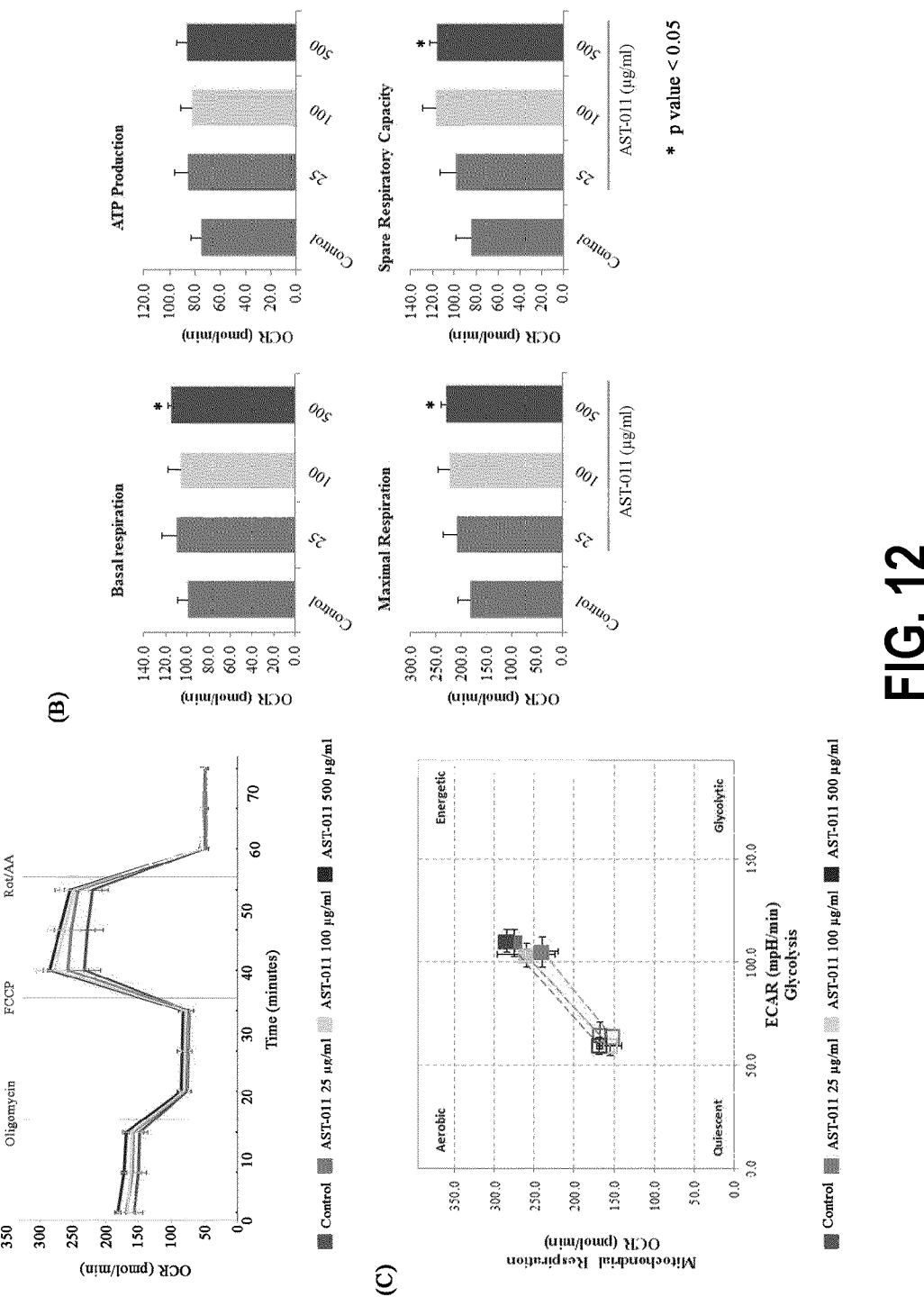
FIG. 12 shows the results of analysis performed using a Seahorse extracellular flux (XF) analyzer to examine the effect of the magnesium-serinate (AST-011) of the present invention on the metabolic capacity of the mitochondrial energy production system and respiration system in mouse hippocampal neuronal HT-22 cells.

To examine whether the cell proliferation activation of each of L-serine and magnesium-serinate (AST-011) is associated with the improvement of mitochondrial function, the oxygen consumption rate of mitochondria was examined by the method described in the "Materials and Method section". As a result, as shown in FIG. 12, it could be confirmed that each of the two drugs (L-serine and AST-011) increased the OCR value, thus improving the function of mitochondria. Specifically, it was shown that, for L-serine, the OCR value increased at a treatment concentration of up to 100 µg/ml and then decreased slightly at 500 µg/ml (FIG. 12A), whereas for AST-011, the OCR value increased at a treatment concentration of 500 µg/ml (FIG. 12B). These results were consistent with the cell proliferation activity experiment results shown in FIG. 11.

5. Neuronal Protective Activity of Magnesium-Serinate 5.1. Flow Cytometry Assay

First, $1 \times 10^6$ cells were washed three times with 2% FBS-containing PBS solution, and the washed cells were suspended in 70% ethanol and fixed at 4° C. for 1 hour. The fixed cells were washed twice with the same solution, suspended in 250 µl of RNase A solution (50 µg/ml concentration), and incubated at 37° C. for 30 minutes to remove RNA from the cells. Then, DNA in the cells was stained at 37° C. for 20 minutes by adding 250 µl of 1.12% sodium citrate buffer (pH 8.45) containing 50 µg/ml of propidium iodide. The cells were analyzed with a flow cytometer (FACS Calibur), and the distribution of the cell cycle was examined based on the content of stained DNA in each cell.

5.2. Results of Evaluation of Neuronal Cell Protective Activity

Figure 13:
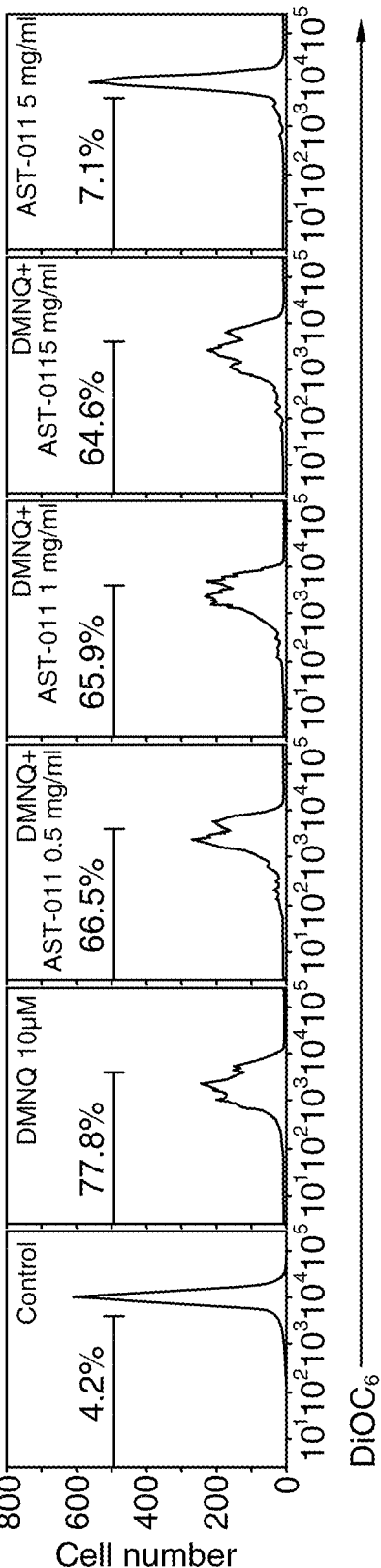
FIG. 13 shows the cell protective effect of the magnesium-serinate (AST-011) of the present invention on the protection of mouse hippocampal neuronal HT-22 cells, treated with DMNQ (2,3-dimethoxy-1,4-napthoquinone), as a function of the treatment concentration of the magnesium-serinate (AST-011).

The cell protective activity of the magnesium-serinate (AST-011) against DMNQ-induced oxidative stress was compared by $DiOC_6$ staining. As a result, as shown in FIG. 13, it was confirmed that, when the cells were treated with DMNQ (10 µM) alone, the cell damage rate was 77.8%, whereas, when the cells were treated with AST-011 at concentrations of 0.5, 1 and 5 mg/ml, the cell damage rates these concentrations were 66.5%, 65.9% and 64.6%, respectively, indicating that the cells are protected from mitochondrial membrane potential damage. From the above results, it could be seen that the AST-011 drug not only had a better ability to activate cell proliferation than L-serine, but also had an excellent activity of protecting neuronal cells from oxidative stress compared to L-serine.

6. Analysis of Blood-Brain Barrier (BBB) Permeability of Magnesium-Serinate 6.1. Analysis of Blood-Brain Barrier (BBB) Permeability Each of L-serine and AST-011 was administered to 7-week-old ICR mice (n=3) at a dose of 600 mg/kg, and then the brain tissue and the blood were collected. The concentrations of L-serine distributed in the blood and the brain were quantified using LC/MS, and the BBB permeability was compared between the drugs by calculating the ratio of the concentration of L-serine in the brain to that in the blood.

6.2. Results of Evaluation of BBB Permeability of Magnesium-Serinate

Figure 14:
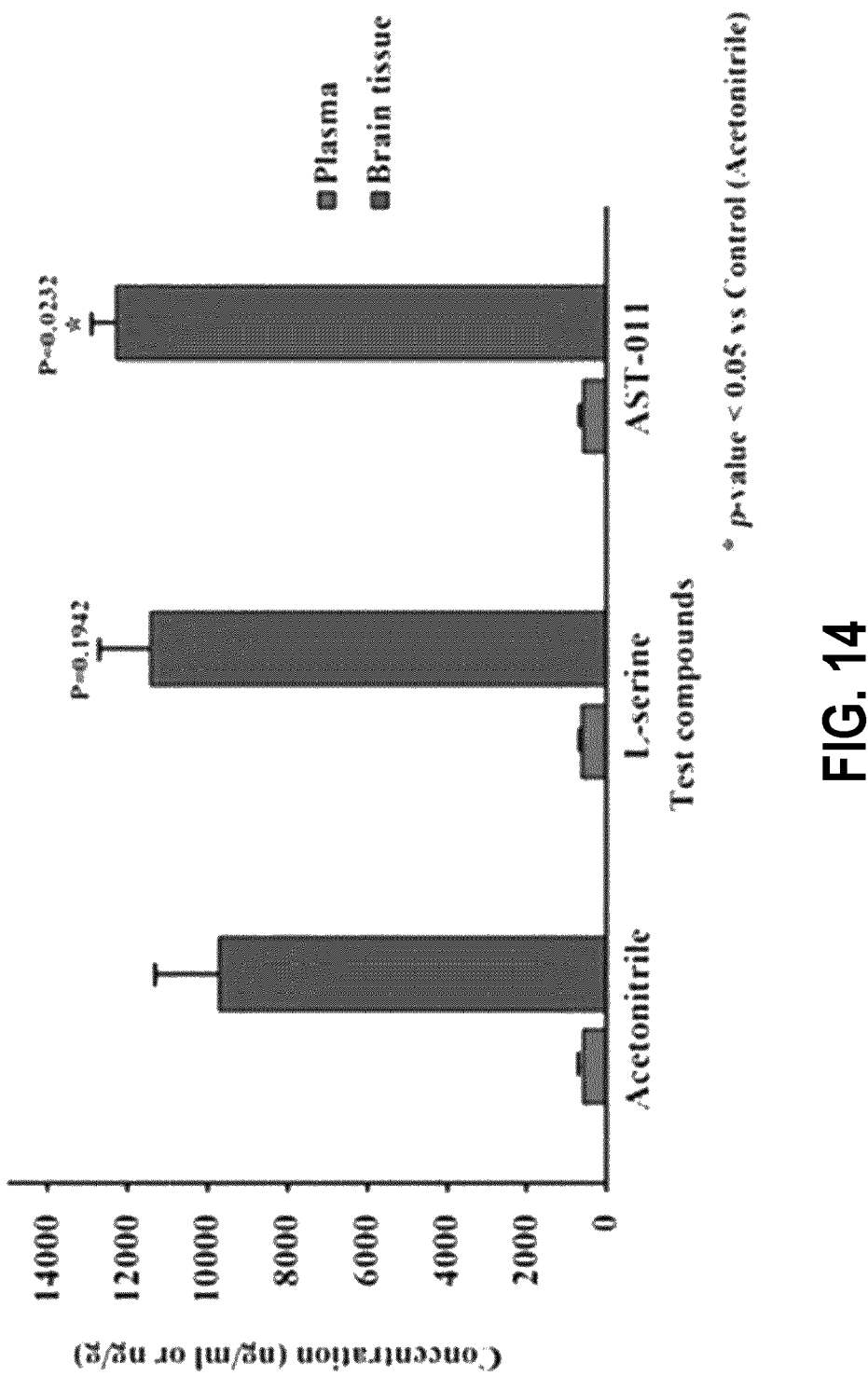
FIG. 14 shows the blood-brain barrier permeabilities of drugs, determined by administering the magnesium-serinate (AST-011) of the present invention to ICR mice, quantifying the concentrations of the magnesium-serinate distributed in the blood and brain, and calculating the ratio of the concentration of the magnesium-serinate in the brain to that in the blood.

The delivery of AST-011 into the brain was compared with that of L-serine, and the results are shown in FIG. 14 and Table 3 below. As shown in FIG. 14 and Table 3, the $C_{brain}/C_{plasm}$ value of the AST-011 drug was 21.85±4.28, which was higher than that of L-serine (18.29±2.43). Consistent with these results, it was shown that the concentrations of L-serine and AST-011 in the brain tissue were 11,410±1299 and 12,296±610, respectively, and the concentrations of L-serine and AST-011 in the plasma were 636±55.2 and 578±103, respectively. Thus, it was confirmed that the magnesium-serinate of the present invention had significantly improved BBB permeability compared to L-serine.

TABLE 3

| Brain/plasma ratio in male ICR mice (600 mg/kg, P.O., mean ± SD, n = 4) | | | |
|---|---|---|---|
| | Concentration (ng/ml or ng/g | | |
| Compounds | Plasma | Brain tissue | $C_{brain}/C_{plasma}$ |
| Acetonitrile | 588 ± 91.2 | 9713 ± 1594 | 16.72 ± 3.11 |
| L-serine | 636 ± 55.2 | 11410 ± 1299 | 18.29 ± 2.43 |
| AST-011 | 578 ± 103 | 12296 ± 610 | 21.85 ± 4.28 |

[National R&D Project That Supported This Invention]
[Grant Number] 52611222
[Ministry Name] Ministry of Small and Medium Business
[Research Management Professional Body] Korea Technology and Information Promotion Agency for Small & Medium Enterprises
[Research Project Name] Start-up Growth-Technology Development Project
[Research Title] Development of functional food for improving autism spectrum disorder
[Contribution Ratio] 1/1
[Managing Department] Astrogen Co., Ltd.
[Research Period] Jun. 29, 2018 through Jun. 28, 2019

The invention claimed is:

1. A compound of Serine-Mg-Serine or a pharmaceutically acceptable salt, solvate, hydrate or isomer of the compound wherein the compound has a peak formed at 800 to 1400 $cm^{-1}$ and lacks a peak formed at 2100 $cm^{-1}$ in Fourier transform infrared analysis:

wherein the compound exhibits a $^{1}H$ NMR peak located at 0.2 ppm upfield from the α-carbon peak and 0.4 to 0.5 ppm upfield from the β-carbon peak of L-serine;

wherein the carbonyl carbon (C=O) resonance of the compound is shifted downfield by 5.556 to 7.509 ppm relative to that of L-serine, and the β-carbon (C—O) resonance is shifted downfield by 2.548 to 3.725 ppm in the $^{13}C$ NMR spectrum; and wherein, for the $^{1}H$ and $^{13}C$ NMR measurements, 100 mg of the compound is dissolved in 0.7 mL of $D_2O$ at 298 K.

2. A pharmaceutical composition for preventing or treating central nervous system diseases, the pharmaceutical composition containing a compound of Serine-Mg-Serine or a pharmaceutically acceptable salt thereof as an active ingredient, wherein the compound has a peak formed at 800 to 1400 $cm^{-1}$ and lacks a peak formed at 2100 $cm^{-1}$ in Fourier transform infrared analysis:

wherein the compound exhibits a $^{1}H$ NMR peak located at 0.2 ppm upfield from the α-carbon peak and 0.4 to 0.5 ppm upfield from the β-carbon peak of L-serine;

wherein the carbonyl carbon (C=O) resonance of the compound is shifted downfield by 5.556 to 7.509 ppm relative to that of L-serine, and the β-carbon (C—O) resonance is shifted downfield by 2.548 to 3.725 ppm in the $^{13}C$ NMR spectrum; and wherein, for the $^{1}H$ and $^{13}C$ NMR measurements, 100 mg of the compound is dissolved in 0.7 mL of $D_2O$ at 298 K.

3. The pharmaceutical composition of claim 2, wherein the central nervous system diseases are selected from the group consisting of cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis.

4. A health functional food for preventing or alleviating central nervous system diseases, the health functional food containing a compound of Serine-Mg-Serine or a pharmaceutically acceptable salt thereof as an active ingredient, wherein the compound has a peak formed at 800 to 1400 $cm^{-1}$ and lacks a peak formed at 2100 $cm^{-1}$ in Fourier transform infrared analysis:

wherein the compound exhibits a $^{1}H$ NMR peak located at 0.2 ppm upfield from the α-carbon peak and 0.4 to 0.5 ppm upfield from the β-carbon peak of L-serine;

wherein the carbonyl carbon (C=O) resonance of the compound is shifted downfield by 5.556 to 7.509 ppm relative to that of L-serine, and the β-carbon (C—O) resonance is shifted downfield by 2.548 to 3.725 ppm in the $^{13}C$ NMR spectrum; and wherein, for the $^{1}H$ and $^{13}C$ NMR measurements, 100 mg of the compound is dissolved in 0.7 mL of $D_2O$ at 298 K.

5. The health functional food of claim 4, wherein the central nervous system diseases are selected from the group consisting of cognitive disorder, intellectual disability, microcephaly, epilepsy, neurodevelopmental disorder, dementia, autism spectrum disorder, Down's syndrome, Rett's syndrome, fragile X syndrome, Alzheimer's disease, Parkinson's disease, Huntington's disease, and amyotrophic lateral sclerosis.

6. A feed additive composition comprising a compound of Serine-Mg-Serine or a pharmaceutically acceptable salt thereof as an active ingredient, wherein the compound has a peak formed at 800 to 1400 $cm^{-1}$ and lacks a peak formed at 2100 $cm^{-1}$ in Fourier transform infrared analysis:

wherein the compound exhibits a $^{1}H$ NMR peak located at 0.2 ppm upfield from the α-carbon peak and 0.4 to 0.5 ppm upfield from the β-carbon peak of L-serine;

wherein the carbonyl carbon (C=O) resonance of the compound is shifted downfield by 5.556 to 7.509 ppm relative to that of L-serine, and the β-carbon (C—O) resonance is shifted downfield by 2.548 to 3.725 ppm in the 13C NMR spectrum; and wherein, for the $^{1}H$ and $^{13}C$ NMR measurements, 100 mg of the compound is dissolved in 0.7 mL of $D_2O$ at 298 K.

7. A reagent composition for inhibiting neuronal cell death, the reagent composition containing a compound of Serine-Mg-Serine or a pharmaceutically acceptable salt thereof, wherein the compound has a peak formed at 800 to 1400 $cm^{-1}$ and lacks a peak formed at 2100 $cm^{-1}$ in Fourier transform infrared analysis:

wherein the compound exhibits a 1H NMR peak located at 0.2 ppm upfield from the α-carbon peak and 0.4 to 0.5 ppm upfield from the β-carbon peak of L-serine;

wherein the carbonyl carbon (C=O) resonance of the compound is shifted downfield by 5.556 to 7.509 ppm relative to that of L-serine, and the β-carbon (C—O) resonance is shifted downfield by 2.548 to 3.725 ppm in the 13C NMR spectrum; and wherein, for the $^{1}H$ and $^{13}C$ NMR measurements, 100 mg of the compound is dissolved in 0.7 mL of $D_2O$ at 298 K.

* * * * *